United States Patent
Kim et al.

(10) Patent No.: US 12,062,791 B2
(45) Date of Patent: Aug. 13, 2024

(54) ELECTRODE COATINGS AND COMPONENTS THEREOF

(71) Applicant: Rivian IP Holdings, LLC, Plymouth, MI (US)

(72) Inventors: Soo Kim, Fremont, CA (US); Yumi Kim, San Jose, CA (US); Majid Talebiesfandarani, San Jose, CA (US); Woochul Shin, Newark, CA (US); Tae Kyoung Kim, Albany, CA (US); Ki Tae Park, Santa Clara, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/054,788

(22) Filed: Nov. 11, 2022

(65) Prior Publication Data

US 2024/0162439 A1 May 16, 2024

(51) Int. Cl.
| | |
|---|---|
| *H01M 4/58* | (2010.01) |
| *H01M 4/04* | (2006.01) |
| *H01M 4/36* | (2006.01) |
| *H01M 4/505* | (2010.01) |

(52) U.S. Cl.
CPC ....... *H01M 4/5825* (2013.01); *H01M 4/0471* (2013.01); *H01M 4/366* (2013.01); *H01M 4/505* (2013.01)

(58) Field of Classification Search
CPC .. H01M 4/5825; H01M 4/0471; H01M 4/366; H01M 4/505
USPC .......................................................... 429/231
See application file for complete search history.

(56) References Cited

U.S. PATENT DOCUMENTS

| | | | | |
|---|---|---|---|---|
| 9,444,102 | B2* | 9/2016 | Tarascon ............... | H01M 4/622 |
| 2002/0168573 | A1* | 11/2002 | Baker .................. | H01M 4/136 |
| | | | | 429/231.95 |
| 2014/0246619 | A1* | 9/2014 | Hautier ............... | H01M 4/5825 |
| | | | | 252/182.1 |
| 2014/0272585 | A1* | 9/2014 | Kerkamm ............. | H01G 11/86 |
| | | | | 429/231.95 |
| 2015/0079473 | A1* | 3/2015 | Kang .................. | H01M 4/1391 |
| | | | | 429/223 |
| 2016/0190569 | A1* | 6/2016 | Sasakawa ........... | H01M 4/5825 |
| | | | | 429/231.95 |
| 2016/0190581 | A1* | 6/2016 | Sasakawa ............. | H01M 4/583 |
| | | | | 429/231.95 |
| 2016/0260965 | A1* | 9/2016 | Wu ....................... | H01M 4/366 |

OTHER PUBLICATIONS

Prabu et al., Synthesis, Impendance and Electrochemical Studies of Lithium Iron Fluorophosphate, LiFePO4F Cathode, Sep. 3, 2012, Electrochimica Acta, vol. 85, p. 572 (Abstract) and 573 (Year: 2012).*

Sharma et al., Fluorophosphates: Next Generation Cathode Materials for Rechargeable Batteries, Jul. 16, 2020, Advanced Energy Materials, vol. 10, pp. 1-27 (Year: 2020).*

* cited by examiner

*Primary Examiner* — Pamela H Weiss
*Assistant Examiner* — John S Medley
(74) *Attorney, Agent, or Firm* — Foley & Lardner LLP

(57) ABSTRACT

Provided herein is a cathode. The cathode can include a cathode active material. The cathode can include a coating disposed on the cathode active material. The coating can include $Li_xM_{1-y}^1M_y^2AF_z(OH)_u$, where $M^1$ is a first metal, $M^2$ is a second metal, A is an anionic species, $1 \le x \le 2$, $0 \le y \le 1$, $0 \le z \le 1$, and $0 \le u \le 1$.

20 Claims, 16 Drawing Sheets

ELECTRODE COATINGS AND COMPONENTS THEREOF

INTRODUCTION

Batteries can have different power capacities to charge and discharge power to operate machines.

SUMMARY

Oxygen gas evolution in the cathode can lead to thermal runaway at high temperatures. In manganese-containing cathodes, delithiated $Li_{1-x}MnPO_4$ may lead to oxygen gas evolution at much lower temperatures in case of thermal runaway as compared to delithiated $Li_{1-x}FePO_4$. Additionally, if exposed directly at the electrode surface in contact with liquid electrolytes, manganese from manganese-containing cathodes dissolves (in $Mn^{2+}$ (aq.) form), and further reacts to form manganese metal ($Mn^0$) at the anode, leading to degradation of the battery. Thus, there remains a need for apparatuses, systems, and methods that may improve performance of cells comprising manganese-containing cathodes.

At least one aspect is directed to a cathode. The cathode can include a cathode active material. The cathode can include a coating disposed on the cathode active material. The coating can include $Li_xM_{1-y}^1M_y^2AF_z(OH)_u$, where $M^1$ is a first metal, $M^2$ is a second metal, A is an anionic species, $1 \leq x \leq 2$, $0 \leq y \leq 1$, $0 \leq z \leq 1$, and $0 \leq u \leq 1$. In some aspects, $M^1$ is selected from Al, Ga, V, Fe, Mn, and Ti. In some aspects, $M^1$ is selected from Mn, Fe, Co, Ni, V, and Cr, and $M^2$ is independently selected from $M^1$ and is selected from Mn, Fe, Co, Ni, V, and Cr. In some aspects, A is $PO_4$. In some aspects, A is selected from $SO_4$, $P_2O_7$, $CO_3$, and $SiO_4$. In some aspects, $Li_xM_{1-y}^1M_y^2AF_z(OH)_u$ is one or more selected from $LiFePO_4(OH)$, $LiFePO_4F$, $Li_2FePO_4F$, $LiMnSO_4F$, $LiMnP_2O_7F$, $LiVPO_4F$, $Li(Fe_{1-y}Mn_y)SO_4F$, $LiFeSO_4F$, $Li_2CoP_2O_7$, $LiVP_2O_7$, $Li_2VOP_2O_7$, $Li_2(Fe_{1-y}Mn_y)P_2O_7$, $Li_2FeP_2O_7$, and $LiMnF_2$, including combinations of any two or more thereof.

At least one aspect is directed to a method. The method can include disposing a coating on a cathode active material of a cathode. The coating can include $Li_xM_{1-y}^1M_yAF_z(OH)_u$, where $M^1$ is a first metal, $M^2$ is a second metal, A is an anionic species, $1 \leq x \leq 2$, $0 \leq y \leq 1$, $0 \leq z \leq 1$, and $0 \leq u \leq 1$. In some aspects, $M^1$ is selected from Al, Ga, V, Fe, Mn, and Ti. In some aspects, $M^1$ is selected from Mn, Fe, Co, Ni, V, and Cr, and $M^2$ is independently selected from $M^1$ and is selected from Mn, Fe, Co, Ni, V, and Cr. In some aspects, A is $PO_4$. In some aspects, A is selected from $SO_4$, $P_2O_7$, $CO_3$, and $SiO_4$. In some aspects, $Li_xM_{1-y}^1M_y^2AF_z(OH)_u$ is one or more selected from $LiFePO_4(OH)$, $LiFePO_4F$, $Li_2FePO_4F$, $LiMnSO_4F$, $LiMnP_2O_7F$, $LiVPO_4F$, $Li(Fe_{1-y}Mn_y)SO_4F$, $LiFeSO_4F$, $Li_2CoP_2O_7$, $LiVP_2O_7$, $Li_2VOP_2O_7$, $Li_2(Fe_{1-y}Mn_y)P_2O_7$, $Li_2FeP_2O_7$, and $LiMnF_2$, including combinations of any two or more thereof. In accordance with any of these aspects, a method may comprise combining a first precursor of the coating, a second precursor of the coating, and optionally a third precursor of the coating, with a cathode active material; and heating the coating precursors and the cathode active material. In some aspects of any of the foregoing, a method comprises combining $FePO_4$, LiF, and a cathode active material; and heating the $FePO_4$, LiF, and cathode active material at a temperature in a range from 500° C. to 600° C. In other aspects of any of the foregoing, a method comprises combining $MnSO4 \cdot H2O$, LiF, and a cathode active material; and heating the $MnSO4 \cdot H2O$, LiF, and cathode active material at a temperature in a range from 300° C. to 600° C.

At least one aspect is directed to an electric vehicle. The electric vehicle can include a battery. The battery can include a cathode. The cathode can include a cathode active material. The cathode can include a coating disposed on the cathode active material. The coating can include $Li_xM_{1-y}^1M_y^2AF_z(OH)_u$, where $M^1$ is a first metal, $M^2$ is a second metal, A is an anionic species, $1 \leq x \leq 2$, $0 \leq y \leq 1$, $0 \leq z \leq 1$, and $0 \leq u \leq 1$. In some aspects, $M^1$ is selected from Al, Ga, V, Fe, Mn, and Ti. In some aspects, $M^1$ is selected from Mn, Fe, Co, Ni, V, and Cr, and $M^2$ is independently selected from $M^1$ and is selected from Mn, Fe, Co, Ni, V, and Cr. In some aspects, A is $PO_4$. In some aspects, A is selected from $SO_4$, $P_2O_7$, $CO_3$, and $SiO_4$. In some aspects, $Li_xM_{1-y}^1M_y^2AF_z(OH)_u$ is one or more selected from $LiFePO_4(OH)$, $LiFePO_4F$, $Li_2FePO_4F$, $LiMnSO_4F$, $LiMnP_2O_7F$, $LiVPO_4F$, $Li(Fe_{1-y}Mn_y)SO_4F$, $LiFeSO_4F$, $Li_2CoP_2O_7$, $LiVP_2O_7$, $Li_2VOP_2O_7$, $Li_2(Fe_{1-y}Mn_y)P_2O_7$, $Li_2FeP_2O_7$, and $LiMnF_2$, including combinations of any two or more thereof.

At least one aspect is directed to a system. The system can include a battery. The battery can include a cathode. The cathode can include a cathode active material. The cathode can include a coating disposed on the cathode active material. The coating can include $Li_xM_{1-y}^1M_y^2AF_z(OH)_u$, where $M^1$ is a first metal, $M^2$ is a second metal, A is an anionic species, $1 \leq x \leq 2$, $0 \leq y \leq 1$, $0 \leq z \leq 1$ and $0 \leq u \leq 1$. In some aspects, $M^1$ is selected from Al, Ga, V, Fe, Mn, and Ti. In some aspects, $M^1$ is selected from Mn, Fe, Co, Ni, V, and Cr, and $M^2$ is independently selected from $M^1$ and is selected from Mn, Fe, Co, Ni, V, and Cr. In some aspects, A is $PO_4$. In some aspects, A is selected from $SO_4$, $P_2O_7$, $CO_3$, and $SiO_4$. In some aspects, $Li_xM_{1-y}^1M_y^2AF_z(OH)_u$ is one or more selected from $LiFePO_4(OH)$, $LiFePO_4F$, $Li_2FePO_4F$, $LiMnSO_4F$, $LiMnP_2O_7F$, $LiVPO_4F$, $Li(Fe_{1-y}Mn_y)SO_4F$, $LiFeSO_4F$, $Li_2CoP_2O_7$, $LiVP_2O_7$, $Li_2VOP_2O_7$, $Li_2(Fe_{1-y}Mn_y)P_2O_7$, $Li_2FeP_2O_7$, and $LiMnF_2$, including combinations of any two or more thereof.

At least one aspect is directed to a battery. The battery can include a cathode. The cathode can include a cathode active material. The cathode can include a coating disposed on the cathode active material. The coating can include $Li_xM_{1-y}^1M_y^2AF_z(OH)_u$, where $M^1$ is a first metal, $M_y^2$ is a second metal, A is an anionic species, $1 \leq x \leq 2$, $0 \leq y \leq 1$, $0 \leq z \leq 1$, and $0 \leq u \leq 1$. In some aspects, $M^1$ is selected from Al, Ga, V, Fe, Mn, and Ti. In some aspects, $M^1$ is selected from Mn, Fe, Co, Ni, V, and Cr, and $M^2$ is independently selected from $M^1$ and is selected from Mn, Fe, Co, Ni, V, and Cr. In some aspects, A is $PO_4$. In some aspects, A is selected from $SO_4$, $P_2O_7$, $CO_3$, and $SiO_4$. In some aspects, $Li_xM_{1-y}^1M_y^2AF_z(OH)_u$ is one or more selected from $LiFePO_4(OH)$, $LiFePO_4F$, $Li_2FePO_4F$, $LiMnSO_4F$, $LiMnP_2O_7F$, $LiVPO_4F$, $Li(Fe_{1-y}Mn_y)SO_4F$, $LiFeSO_4F$, $Li_2CoP_2O_7$, $LiVP_2O_7$, $Li_2VOP_2O_7$, $Li_2(Fe_{1-y}Mn_y)P_2O_7$, $Li_2FeP_2O_7$, and $LiMnF_2$ including combinations of any two or more thereof.

In accordance with any of the foregoing aspects, $M^1$ may be selected from Al, Ga, V, Fe, Mn, and Ti, A may be $PO_4$, and y=0. In accordance with any of the foregoing aspects, $Li_xM_{1-y}^1M_y^2AF_z(OH)_u$ may be $Li_xFePO_4F$. In accordance with any of the foregoing aspects, $Li_xM_{1-y}^1M_y^2AF_z(OH)_u$ may be $LiFePO_4F$. Alternatively, in accordance with any of the foregoing aspects, $Li_xM_{1-y}^1M_y^2AF_z(OH)_u$ may be $Li_2FePO_4F$. Alternatively, in accordance with any of the foregoing aspects, $Li_xM_{1-y}^1M_y^2AF_z(OH)_u$ may be $LiMnSO_4F$. Alternatively, in accordance with any of the foregoing aspects, $Li_xM_{1-y}^1M_y^2AF_z(OH)_u$ may be $LiMn_{1-y}Fe_ySO_4F$. Alternatively, in accordance with any of the foregoing aspects, $Li_xM_{1-y}^1M_y^2AF_z(OH)_u$ may be one or more selected from $LiMnSO_4F$, $LiMnP_2O_7F$, and $LiMnF_2$, and combinations of any two or more thereof.

In accordance with any of the foregoing aspects, a crystal structure of $Li_xM_{1-y}^1M_y^2AF_z(OH)_u$ may be triclinic. Alternatively, in accordance with any of the foregoing aspects, $Li_xM_{1-y}^1M_y^2AF_z(OH)_u$ may be arranged in a tavorite structure. Alternatively, in accordance with any of the foregoing aspects, a crystal structure of $Li_xM_{1-y}^1M_y^2AF_z(OH)_u$ may be triplite.

In accordance with any of the foregoing aspects, $Li_xM_{1-y}^1M_y^2AF_z(OH)_u$ may be thermally stable in a temperature range from 0° C. to 500° C.

In accordance with any of the foregoing aspects, the coating may be configured to reduce dissolution of manganese from the cathode compared to a cathode without the coating.

In accordance with any of the foregoing aspects, the cathode may comprise one or more materials from LMFP, LMO, $LiMO_2$, $Li_{1+x1}M_{1-x1}O_2$, and $Li_2MnO_3$.

These and other aspects and implementations are discussed in detail below. The foregoing information and the following detailed description include illustrative examples of various aspects and implementations, and provide an overview or framework for understanding the nature and character of the apparatuses, systems and methods disclosed herein. The drawings provide illustration and a further understanding of the various aspects and implementations, and are incorporated in and constitute a part of this disclosure. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
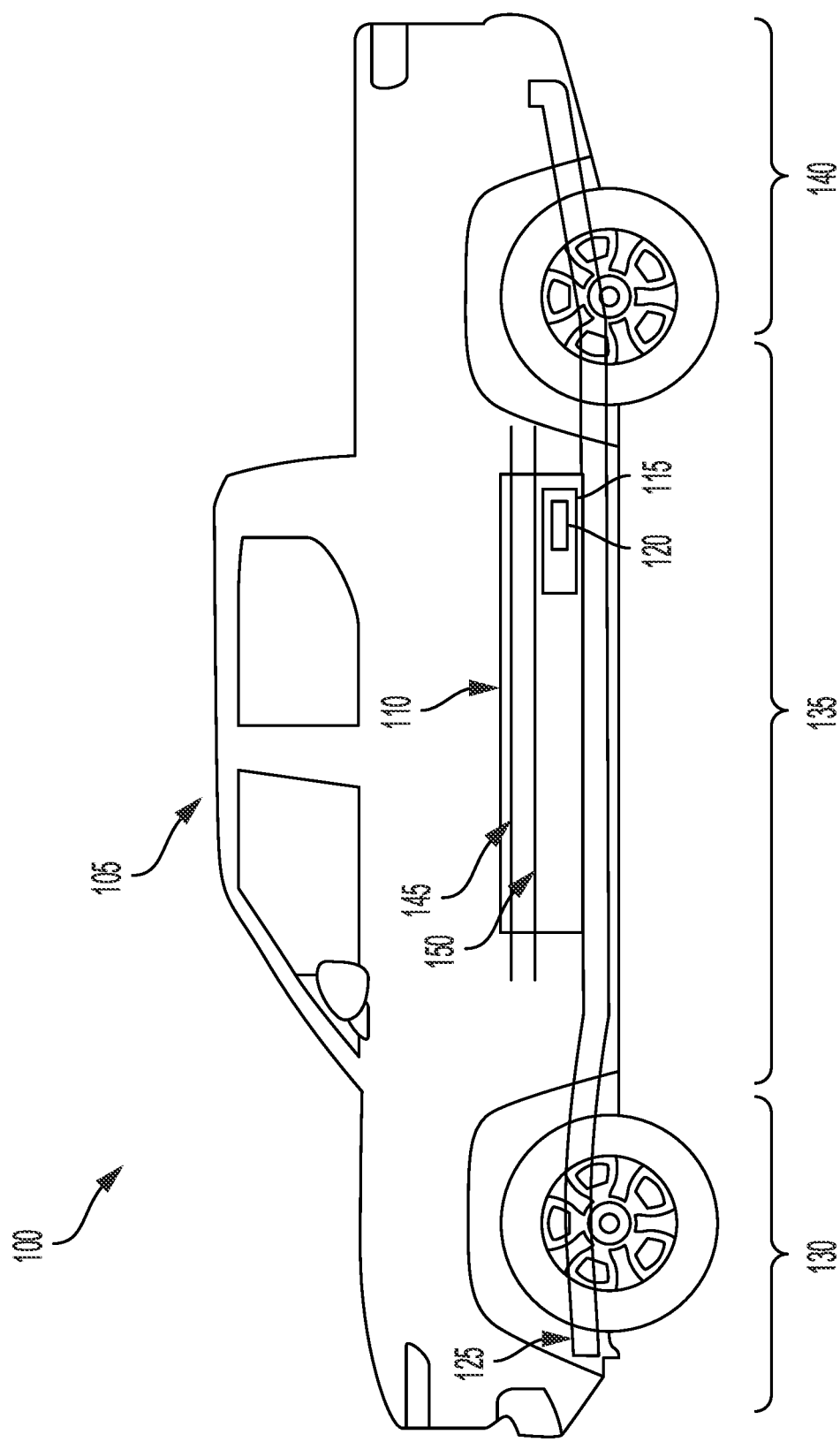
FIG. 1 depicts a cross-sectional view of an electric vehicle, according to an example implementation.

Following below are more detailed descriptions of various concepts related to, and implementations of, methods, apparatuses, and systems of for reducing the degradation of batteries. The various concepts introduced above and discussed in greater detail below may be implemented in any of numerous ways.

The present disclosure is directed to apparatuses, systems, and methods for reducing or preventing the degradation of batteries. The cathode can oxidize and undergo a chemical decomposition reaction. Additionally, oxygen gas evolution in the cathode can lead to thermal runaway.

Oxygen gas evolution in the cathode can lead to thermal runaway at high temperatures. In manganese-containing cathodes, delithiated $Li_{1-x}MnPO_4$ may lead to oxygen gas evolution at much lower temperatures in case of thermal runaway as compared to delithiated $Li_{1-x}FePO_4$. For example, while the lithiated $LiMnPO_4$ phase may be stable up to very high temperatures, delithiated $MnPO_4$ may gradually undergo a thermal decomposition reaction such as: $2 MnPO_4 \rightarrow Mn_2P_2O_7 + \frac{1}{2} O_2(g)$. This reaction can start at a temperature above 200° C. or higher, depending on powder quality, nature of the coating, local structure, etc.

Additionally, manganese ions from manganese-containing cathodes can dissolve (in $Mn^{2+}_{(aq.)}$ form) in liquid electrolytes, and react to form manganese metal ($Mn^0$) at the anode, leading to degradation of the battery. For example, the dissolved manganese ions can react with HF present in the electrolyte to form $MnF_2$ in the solid electrolyte interphase of the battery, and further reduction of $MnF_2$ within the electrochemical cell can lead to manganese metal formation and deposition at the anode. Such manganese metal can increase the polarization of the anode and increase the impedance and/or resistance of the battery. These problems may arise in any battery comprising a Mn-containing cathode, such as a $LiMn_aFe_{1-a}PO_4$ (LMFP) cathode, where $0 \le a \le 1$, or a $LiMn_2O_4$ (LMO) cathode.

Addressing these problems, a technical solution described herein is a cathode including a cathode active material. The cathode can include a coating disposed on the cathode active material. The coating can include $Li_xM_{1-y}^1M_y^2AF(OH)_u$, where $M^1$ is a first metal, $M^2$ is a second metal, A is an anionic species, $1 \le x \le 2$, $0 \le y \le 1$, $0 \le z \le 1$, and $0 \le u \le 1$. In some aspects, $M^1$ is selected from Al, Ga, V, Fe, Mn, and Ti. In some aspects, $M^1$ is selected from Mn, Fe, Co, Ni, V, and Cr, and $M^2$ is independently selected from $M^1$ and is selected from Mn, Fe, Co, Ni, V, and Cr. In some aspects, A is $PO_4$. In some aspects, A is selected from $SO_4$, $P_2O_7$, $CO_3$, and $SiO_4$. In specific aspects, $Li_xM_{1-y}^1M_y^2AF(OH)_u$ is one or more selected from $LiFePO_4(OH)$, $LiFePO_4F$, $Li_2FePO_4F$, $LiMnSO_4F$, $LiMnP_2O_7F$, $LiVPO_4F$, $Li(Fe_{1-y}Mn_y)SO_4F$, $LiFeSO_4F$, $Li_2CoP_2O_7$, $LiVP_2O_7$, $Li_2VOP_2O_7$, $Li_2(Fe_{1-y}Mn_y)P_2O_7$, $Li_2FeP_2O_7$, and $LiMnF_2$ including combinations of any two or more thereof.

The disclosed solutions have a technical advantage of reducing or preventing manganese metal formation in the battery cell. The solutions can decrease the cell polarization coming from the anode and decrease the overall impedance resistance of the battery. The solutions can reduce or prevent decrease of battery capacity over time. The solutions can reduce or suppress oxygen gas evolution in the cathode. Further details are discussed and illustrated below with reference to the drawings.

FIG. 1 depicts an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, batteries 115 or battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery 115, the battery modules 115, or the battery cells 120 with other electrical components of the electric vehicle 105 to provide electrical power to various systems or components of the electric vehicle 105.

Figure 2A:
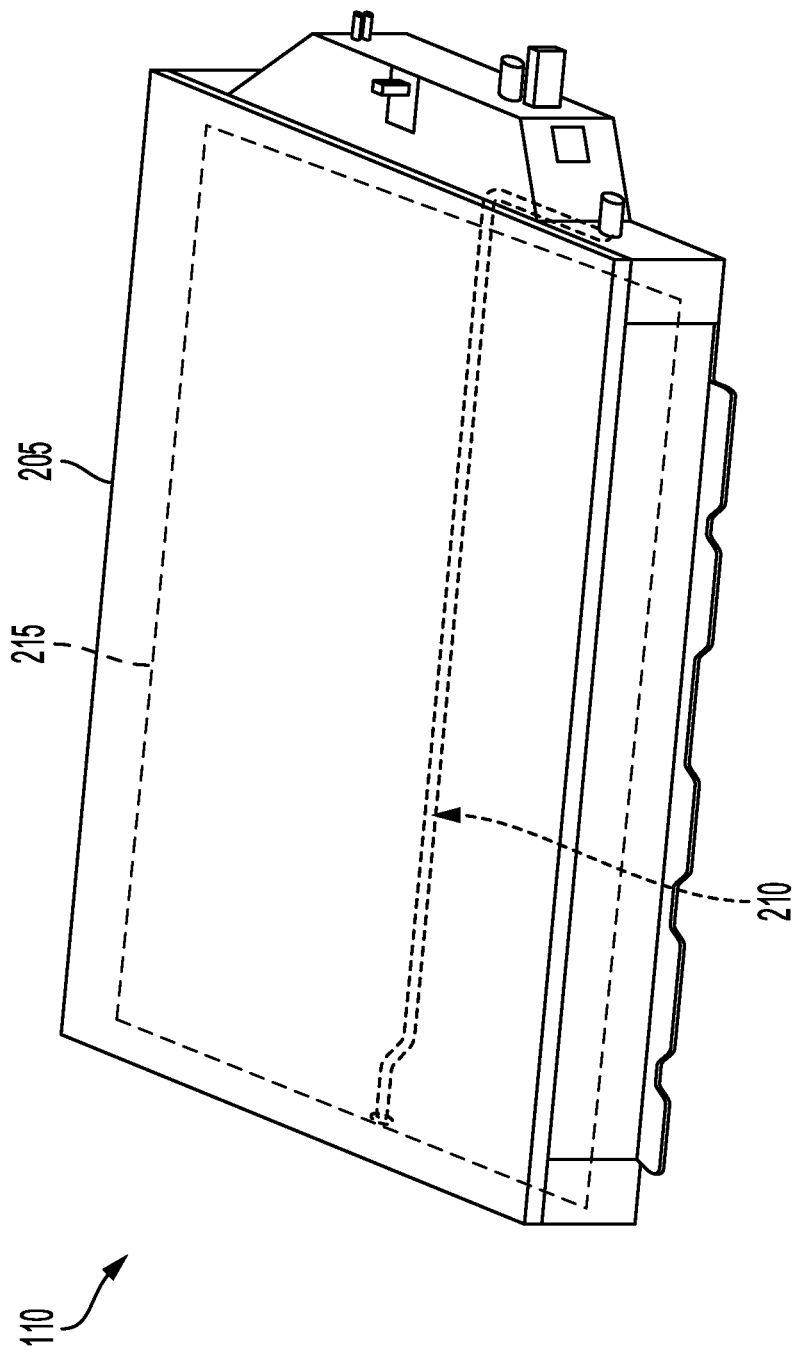
FIG. 2A depicts a battery pack, according to an example implementation.

FIG. 2A depicts an example battery pack 110. Referring to FIG. 2A, among others, the battery pack 110 can provide power to electric vehicle 105. Battery packs 110 can include any arrangement or network of electrical, electronic, mechanical or electromechanical devices to power a vehicle of any type, such as the electric vehicle 105. The battery pack 110 can include at least one housing 205. The housing 205 can include at least one battery module 115 or at least one battery cell 120, as well as other battery pack components. The battery module 115 can be or can include one or more groups of prismatic cells, cylindrical cells, pouch cells, or other form factors of battery cells 120. The housing 205 can include a shield on the bottom or underneath the battery module 115 to protect the battery module 115 and/or cells 120 from external conditions, for example if the electric vehicle 105 is driven over rough terrains (e.g., off-road, trenches, rocks, etc.) The battery pack 110 can include at least one cooling line 210 that can distribute fluid through the battery pack 110 as part of a thermal/temperature control or heat exchange system that can also include at least one thermal component (e.g., cold plate) 215. The thermal component 215 can be positioned in relation to a top submodule and a bottom submodule, such as in between the top and bottom submodules, among other possibilities. The battery pack 110 can include any number of thermal components 215. For example, there can be one or more thermal components 215 per battery pack 110, or per battery module 115. At least one cooling line 210 can be coupled with, part of, or independent from the thermal component 215.

Figure 2B:
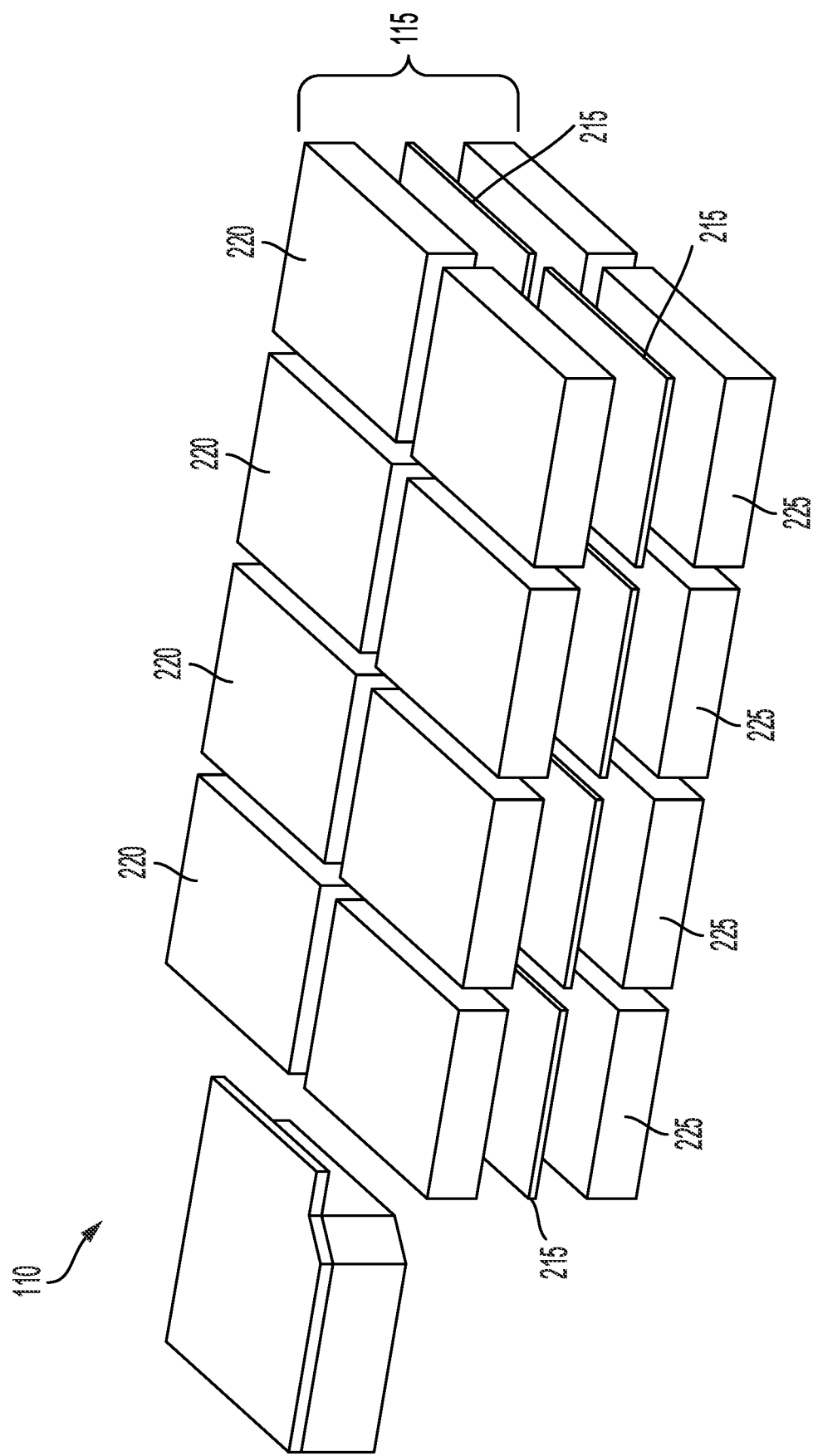
FIG. 2B depicts a battery module, according to an example implementation.
Figure 2C:
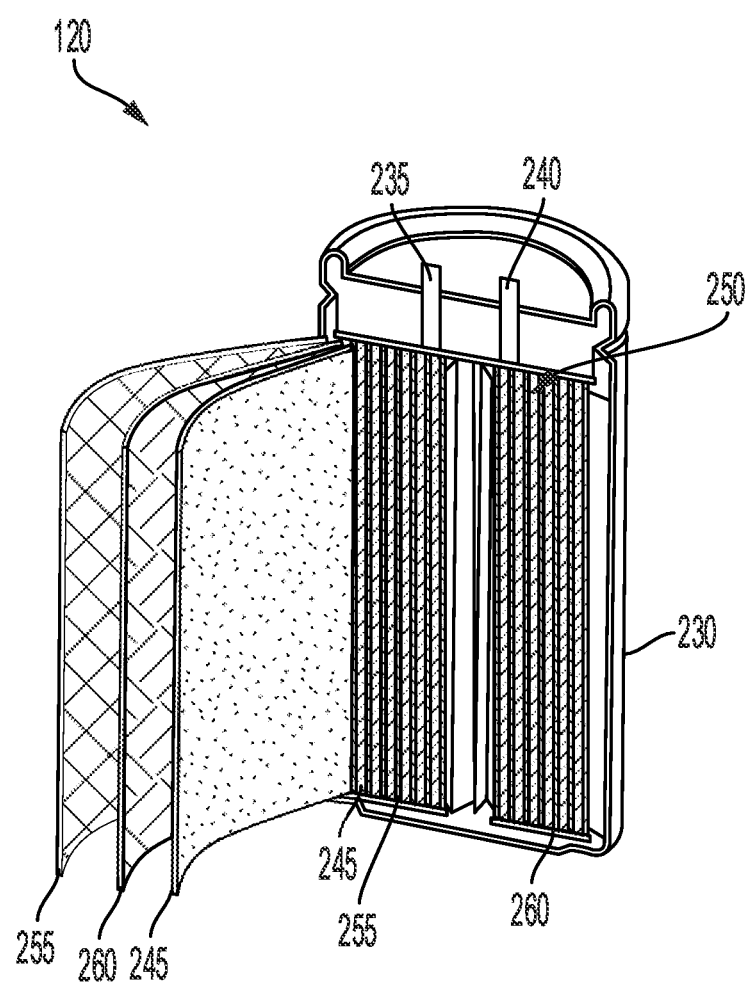
FIG. 2C depicts a cross-sectional view of a battery cell, according to an example implementation.
Figure 2D:
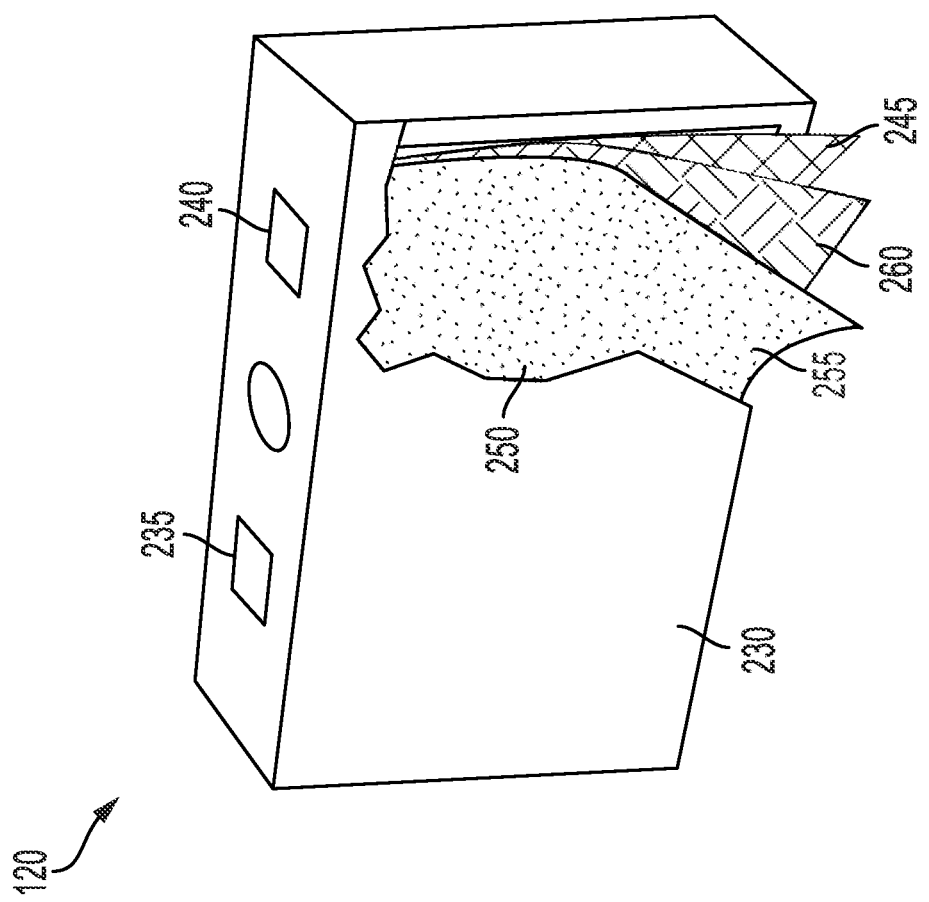
FIG. 2D depicts a cross-sectional view of a battery cell, according to an example implementation.
Figure 2E:
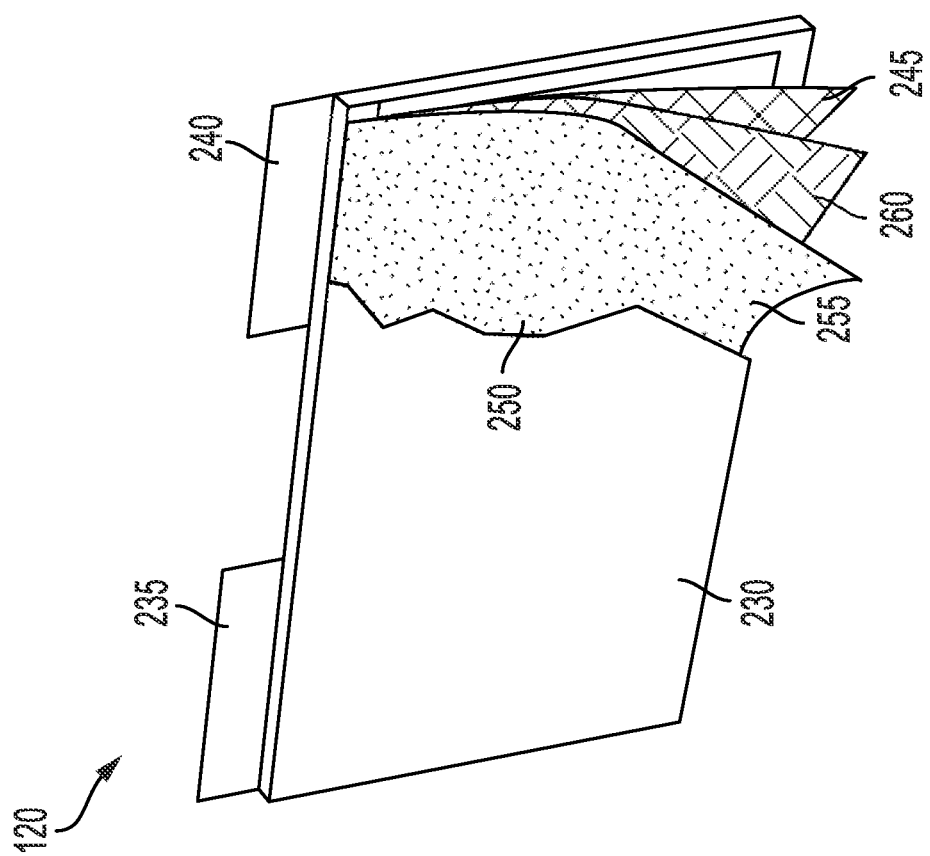
FIG. 2E depicts a cross-sectional view of a battery cell, according to an example implementation.

FIG. 2B depicts example battery modules 115, and FIGS. 2C, 2D and 2E depict an example cross-sectional view of a battery cell 120. The battery modules 115 can include at least one submodule. For example, the battery modules 115 can include at least one first (e.g., top) submodule 220 or at least one second (e.g., bottom) submodule 225. At least one thermal component 215 can be disposed between the top submodule 220 and the bottom submodule 225. For example, one thermal component 215 can be configured for heat exchange with one battery module 115. The thermal component 215 can be disposed or thermally coupled between the top submodule 220 and the bottom submodule 225. One thermal component 215 can also be thermally coupled with more than one battery module 115 (or more than two submodules 220, 225). The thermal components 215 shown adjacent to each other can be combined into a single thermal component 215 that spans the size of one or more submodules 220 or 225. The thermal component 215 can be positioned underneath submodule 220 and over submodule 225, in between submodules 220 and 225, on one or more sides of submodules 220, 225, among other possibilities. The thermal component 215 can be disposed in sidewalls, cross members, structural beams, among various other components of the battery pack, such as battery pack 110 described above. The battery submodules 220, 225 can collectively form one battery module 115. In some examples each submodule 220, 225 can be considered as a complete battery module 115, rather than a submodule.

The battery modules 115 can each include a plurality of battery cells 120. The battery modules 115 can be disposed within the housing 205 of the battery pack 110. The battery modules 115 can include battery cells 120 that are cylindrical cells or prismatic cells, for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 205. It should also be noted that each battery module 115 may include a top submodule 220 and a bottom submodule 225, possibly with a thermal component 215 in between the top submodule 220 and the bottom submodule 225. The battery pack 110 can include or define a plurality of areas for positioning of the battery module 115 and/or cells 120. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120. It should be noted the illustrations and descriptions herein are provided for example purposes and should not be interpreted as limiting. For example, the battery cells 120 can be inserted in the battery pack 110 without battery modules 220 and 225. The battery cells 120 can be disposed in the battery pack 110 in a cell-to-pack configuration without modules 220 and 225, among other possibilities.

Battery cells 120 have a variety of form factors, shapes, or sizes. For example, battery cells 120 can have a cylindrical, rectangular, square, cubic, flat, pouch, elongated or prismatic form factor. As depicted in FIG. 2C, for example, the battery cell 120 can be cylindrical. As depicted in FIG. 2D, for example, the battery cell 120 can be prismatic. As depicted in FIG. 2E, for example, the battery cell 120 can include a pouch form factor. Battery cells 120 can be assembled, for example, by inserting a winded or stacked electrode roll (e.g., a jelly roll) including electrolyte material into at least one battery cell housing 230. The electrolyte material, e.g., an ionically conductive fluid or other material, can support electrochemical reactions at the electrodes to generate, store, or provide electric power for the battery cell by allowing for the conduction of ions between a positive electrode and a negative electrode. The battery cell 120 can include an electrolyte layer where the electrolyte layer can be or include solid electrolyte material that can conduct ions. For example, the solid electrolyte layer can conduct ions without receiving a separate liquid electrolyte material. The electrolyte material, e.g., an ionically conductive fluid or other material, can support conduction of ions between electrodes to generate or provide electric power for the battery cell 120. The housing 230 can be of various shapes, including cylindrical or rectangular, for example. Electrical connections can be made between the electrolyte material and components of the battery cell 120. For example, electrical connections to the electrodes with at least some of the electrolyte material can be formed at two points or areas of the battery cell 120, for example to form a first polarity terminal 235 (e.g., a positive or anode terminal) and a second polarity terminal 240 (e.g., a negative or cathode terminal). The polarity terminals can be made from electrically conductive materials to carry electrical current from the battery cell 120 to an electrical load, such as a component or system of the electric vehicle 105.

For example, the battery cell 120 can include at least one lithium-ion battery cell. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell 120 to separate the anode and cathode from each other and to facilitate transfer of lithium ions between the anode and cathode. It should be noted that battery cell 120 can also take the form of a solid state battery cell developed using solid electrodes and solid electrolytes. Solid electrodes or electrolytes can be or include inorganic solid electrolyte materials (e.g., oxides, sulfides, phosphides, ceramics), solid polymer electrolyte materials, hybrid solid state electrolytes, or any combination thereof. In some implementations, the solid electrolyte layer can include polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxy-nitride ($Li_xPO_yN_z$). In some implementations, the solid electrolyte layer can include a glassy, ceramic and/or crystalline sulfide-based electrolyte (e.g., $Li_3PS_4$, $Li_7P_3S_{11}$, $Li_2S$—$P_2S_5$, $Li_2S$—$B_2S_3$, $SnS$—$P_2S_5$, $Li_2S$—$SiS_2$, $Li_2S$—$P_2S_5$, $Li_2S$—$GeS_2$, $Li_{10}GeP_2Si_2$) and/or sulfide-based lithium argyrodites with formula $Li_6PS_5X$ (X=Cl, Br) like $Li_6PS_5Cl$. Furthermore, the solid electrolyte layer can include a polymer electrolyte material (e.g., a hybrid or pseudo-solid state electrolyte), for example, polyacrylonitrile (PAN), polyethylene oxide (PEO), polymethylmethacrylate (PMMA), and polyvinylidene fluoride (PVDF), among others.

The battery cell 120 can be included in battery modules 115 or battery packs 110 to power components of the electric vehicle 105. The battery cell housing 230 can be disposed in the battery module 115, the battery pack 110, or a battery array installed in the electric vehicle 105. The housing 230 can be of any shape, such as cylindrical with a circular (e.g., as depicted in FIG. 2C, among others), elliptical, or ovular base, among others. The shape of the housing 230 can also be prismatic with a polygonal base, as shown in FIG. 2D, among others. As shown in FIG. 2E, among others, the housing 230 can include a pouch form factor. The housing 230 can include other form factors, such as a triangle, a square, a rectangle, a pentagon, and a hexagon, among others. In some implementations, the battery pack may not include modules (e.g., module-free). For example, the battery pack can have a module-free or cell-to-pack configuration where the battery cells are arranged directly into a battery pack without assembly into a module.

The housing 230 of the battery cell 120 can include one or more materials with various electrical conductivity or thermal conductivity, or any combination thereof. The electrically conductive and thermally conductive material for the housing 230 of the battery cell 120 can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 230 of the battery cell 120 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others. In examples where the housing 230 of the battery cell 120 is prismatic (e.g., as depicted in FIG. 2D, among others) or cylindrical (e.g., as depicted in FIG. 2C, among others), the housing 230 can include a rigid or semi-rigid material such that the housing 230 is rigid or semi-rigid (e.g., not easily deformed or manipulated into another shape or form factor). In examples where the housing 230 includes a pouch form factor (e.g., as depicted in FIG. 2E, among others), the housing 230 can include a flexible, malleable, or non-rigid material such that the housing 230 can be bent, deformed, manipulated into another form factor or shape.

The battery cell 120 can include at least one anode layer 245, which can be disposed within the cavity 250 defined by the housing 230. The anode layer 245 can include a first redox potential. The anode layer 245 can receive electrical current into the battery cell 120 and output electrons during the operation of the battery cell 120 (e.g., charging or discharging of the battery cell 120). The anode layer 245 can include an active substance. The active substance can include, for example, an activated carbon or a material infused with conductive materials (e.g., artificial or natural graphite, or blended), lithium titanate ($Li_4Ti_5O_{12}$), or a silicon-based material (e.g., silicon metal, oxide, carbide, pre-lithiated), or other lithium alloy anodes (Li—Mg, Li—Al, Li—Ag alloy etc.) or composite anodes consisting of lithium and carbon, silicon and carbon or other compounds. The active substance can include graphitic carbon (e.g., ordered or disordered carbon with $sp^2$ hybridization), Li metal anode, or a silicon-based carbon composite anode, or other lithium alloy anodes (Li—Mg, Li—Al, Li—Ag alloy etc.) or composite anodes consisting of lithium and carbon, silicon and carbon or other compounds. In some examples, an anode material can be formed within a current collector material. For example, an electrode can include a current collector (e.g., a copper foil) with an in situ-formed anode (e.g., Li metal) on a surface of the current collector facing the separator or solid-state electrolyte. In such examples, the assembled cell does not comprise an anode active material in an uncharged state.

The battery cell 120 can include at least one cathode layer 255 (e.g., a composite cathode layer compound cathode layer, a compound cathode, a composite cathode, or a cathode). The cathode layer 255 can include a second redox potential that can be different than the first redox potential of the anode layer 245. The cathode layer 255 can be disposed within the cavity 250. The cathode layer 255 can output electrical current out from the battery cell 120 and can receive electrons during the discharging of the battery cell 120. The cathode layer 255 can also receive lithium ions during the discharging of the battery cell 120. Conversely, the cathode layer 255 can receive electrical current into the battery cell 120 and can output electrons during the charging of the battery cell 120. The cathode layer 255 can release lithium ions during the charging of the battery cell 120.

The battery cell 120 can include a layer 260 disposed within the cavity 250. The layer 260 can include a solid electrolyte layer. The layer 260 can include a separator wetted by a liquid electrolyte. The layer 260 can include a polymeric material. The layer 260 can include a polymer separator. The layer 260 can be arranged between the anode layer 245 and the cathode layer 255 to separate the anode layer 245 and the cathode layer 255. The polymer separator can physically separate the anode and cathode from a cell short circuit. A separator can be wetted with a liquid electrolyte. The liquid electrolyte can be diffused into the anode layer 245. The liquid electrolyte can be diffused into the cathode layer 255. In the case of a solid electrolyte, the layer 260 can help transfer ions (e.g., $Li^+$ ions) between the anode layer 245 and the cathode layer 255. The layer 260 can transfer $Li^+$ cations from the anode layer 245 to the cathode layer 255 during the discharge operation of the battery cell 120. In the case of a solid electrolyte, the layer 260 can transfer lithium ions from the cathode layer 255 to the anode layer 245 during the charge operation of the battery cell 120. When wetted by a liquid electrolyte, ions (e.g., $Li^+$ ions) can diffuse through the layer 260 (e.g., polymeric separator layer) between the anode layer 245 and the cathode layer 255. The $Li^+$ cations can diffuse through the layer 260 from the anode layer 245 to the cathode layer 255 during the discharge operation of the battery cell 120. The lithium ions can diffuse through the layer 260 from the cathode layer 255 to the anode layer 245 during the charge operation of the battery cell 120.

The redox potential of layers (e.g., the first redox potential of the anode layer 245 or the second redox potential of the cathode layer 255) can vary based on a chemistry of the respective layer or a chemistry of the battery cell 120. For example, lithium-ion batteries can include an LFP (lithium iron phosphate) chemistry, an LMFP (lithium manganese iron phosphate) chemistry, an NMC (Nickel Manganese Cobalt) chemistry, an NCA (Nickel Cobalt Aluminum) chemistry, an OLO (Over Lithiated Oxide) chemistry, or an LCO (lithium cobalt oxide) chemistry for a cathode layer (e.g., the cathode layer 255). Lithium-ion batteries can include a graphite chemistry, a silicon-graphite chemistry, or a lithium metal chemistry for the anode layer (e.g., the anode layer 245).

For example, for a cathode layer (e.g., for cathode layer 255), lithium-ion batteries can include an olivine phosphate ($LiMPO_4$, M=Fe and/or Co and/or Mn and/or Ni)) chemistry, LISICON or NASICON Phosphates ($Li_3M_2(PO_4)_3$ and $LiMPO_4Ox$, M=Ti, V, Mn, Cr, and Zr), for example lithium iron phosphate (LFP), lithium iron manganese phosphate (LMFP), layered oxides ($LiMO_2$, M=Ni and/or Co and/or Mn and/or Fe and/or Al and/or Mg), NMC (Nickel Manganese Cobalt) chemistry, an NCA (Nickel Cobalt Aluminum) chemistry, or an LCO (lithium cobalt oxide) chemistry, as well as lithium rich layer oxides ($Li_{1+x}M_{1-x}O_2$) (Ni, and/or Mn, and/or Co), (OLO or LMR), spinel ($LiMn_2O_4$) and high voltage spinels ($LiMn_{1.5}Ni_{0.5}O_4$), disordered rock salt, fluorophosphates such as $Li_2FePO_4F$ (M=Fe, Co, Ni) and fluorosulfates such as $LiMSO_4F$ (M=Co, Ni, Mn). For an anode layer (e.g., for anode layer 245), lithium-ion batteries can include a graphite chemistry, a silicon-graphite chemistry, or a lithium metal chemistry. For example, a cathode layer having an LFP chemistry can have a redox potential of 3.4 V vs. $Li/Li^+$, while an anode layer having a graphite chemistry can have a 0.2 V vs. $Li/Li^+$ redox potential.

Electrode layers can include anode active material or cathode active material, commonly in addition to a conductive carbon material, a binder, or other additives as a coating on a current collector (metal foil). The chemical composition of the electrode layers can affect the redox potential of the electrode layers. For example, cathode layers (e.g., the cathode layer 255) can include medium to high-nickel content (50 to 80%, or equal to 80% Ni) lithium transition metal oxide, such as a particulate lithium nickel manganese cobalt oxide ("LiNMC"), a lithium nickel cobalt aluminum oxide ("LiNCA"), a lithium nickel manganese cobalt aluminum oxide ("LiNMCA"), or lithium metal phosphates like lithium iron phosphate ("LFP") and lithium manganese iron phosphate ("LMFP"). Anode layers (e.g., the anode layer 245) can include conductive carbon materials such as graphite, carbon black, carbon nanotubes, and the like. Anode layers can include Super P carbon black material, Ketjen Black, Acetylene Black, SWCNT, MWCNT, graphite, carbon nanofiber, or graphene, for example.

Electrode layers can also include chemical binding materials (e.g., binders). Binders can include polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE") or carboxymethylcellulose ("CMC"). Binder materials can include agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrylic acid (PAA), poly(m-ethyl acrylate) (PMA), poly(vinyl alcohol) (PVA), poly (vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or mixtures of any two or more thereof.

Current collector materials (e.g., a current collector foil to which an electrode active material is laminated to form a cathode layer or an anode layer) can include a metal material. For example, current collector materials can include aluminum, copper, nickel, titanium, stainless steel, or carbonaceous materials. The current collector material can be formed as a metal foil. For example, the current collector material can be an aluminum (Al) or copper (Cu) foil. The current collector material can be a metal alloy, made of Al, Cu, Ni, Fe, Ti, or any combination thereof. The current collector material can be a metal foil coated with a carbon material, such as carbon-coated aluminum foil, carbon-coated copper foil, or other carbon-coated foil material.

The layer 260 can include or be made of a liquid electrolyte material. For example, the layer 260 can be or include at least one layer of polymeric material (e.g., polypropylene, polyethylene, or other material) that is wetted (e.g., is saturated with, is soaked with, receives) a liquid electrolyte substance. The liquid electrolyte material can include a lithium salt dissolved in a solvent. The lithium salt for the liquid electrolyte material for the layer 260 can include, for example, lithium tetrafluoroborate ($LiBF_4$), lithium hexafluorophosphate ($LiPF_6$), and lithium perchlorate ($LiClO_4$), among others. The solvent can include, for example, dimethyl carbonate (DMC), ethylene carbonate (EC), and diethyl carbonate (DEC), among others. Liquid electrolyte is not necessarily disposed near the layer 260, but the liquid electrolyte can be filled into the battery cells 120 in many different ways. On the other hand, the layer 260 can include or be made of a solid electrolyte material, such as a ceramic electrolyte material, polymer electrolyte material, or a glassy electrolyte material, or among others, or any combination thereof.

In some implementations, the solid electrolyte film includes at least one layer of a solid electrolyte. Solid electrolyte materials of the solid electrolyte layer can include inorganic solid electrolyte materials (e.g., oxides, sulfides, phosphides, ceramics), solid polymer electrolyte materials, hybrid solid state electrolytes, or any combination thereof. In some implementations, the solid electrolyte layer includes polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxy-nitride ($Li_xPO_yN_z$). In some implementations, the solid electrolyte layer can include a glassy, ceramic and/or crystalline sulfide-based electrolyte (e.g., $Li_3PS_4$, $Li_7P_3S_{11}$, $Li_2S$—$P_2S_5$, $Li_2S$—$B_2S_3$, $SnS$—$P_2S_5$, $Li_2S$—$SiS_2$, $Li_2S$—$P_2S_5$, $Li_2S$—$GeS_2$, $Li_{10}GeP_2Si_2$) and/or sulfide-based lithium argyrodites with formula $Li_6PS_5X$ (X=Cl, Br) like $Li_6PS_5Cl$). Furthermore, the solid electrolyte layer can include a polymer electrolyte material (e.g., a hybrid or pseudo-solid state electrolyte), for example, polyacrylonitrile (PAN), polyethylene oxide (PEO), polymethylmethacrylate (PMMA), and polyvinylidene fluoride (PVDF), among others.

In examples where the layer 260 includes a liquid electrolyte material, the layer 260 can include a non-aqueous polar solvent. The non-aqueous polar solvent can include a carbonate such as ethylene carbonate, propylene carbonate, diethyl carbonate, ethyl methyl carbonate, dimethyl carbonate, or a mixture of any two or more thereof. The layer 260 can include at least one additive. The additives can be or include vinylidene carbonate, fluoroethylene carbonate, ethyl propionate, methyl propionate, methyl acetate, ethyl acetate, or a mixture of any two or more thereof. The layer 260 can include a lithium salt material. For example, the lithium salt can be lithium perchlorate, lithium hexafluorophosphate, lithium bis(fluorosulfonyl)imide, lithium bis(trifluorosulfonyl)imide, or a mixture of any two or more thereof. The lithium salt may be present in the layer 260 from greater than 0 M to about 1.5 M. Once disposed to the battery cell 120, liquid electrolyte can be present and touching battery subcomponents present within the battery cell 120. The battery subcomponents can include the cathode, the anode, the separator, the current collector, etc.

Electrical conductivity is the movement of electrons (e-) when a current (I) is being applied. Adding a conductive agent such as carbon black, CNT, graphene at the electrode fabrication steps or introducing a thin layer of carbon coating on the active cathode material can help increase the electrical conductivity of a given battery system. To introduce a thin layer of carbon coating at the surface of active materials, a hydro-carbon ($C_xH_yO_z$) compound, such as sucrose, glucose, citric acid, acetylene black, citric acid, oxalic acid, or L-Ascorbic acid, can be blended, mixed, or milled together with a given active material or precursor. When these C-containing precursors are heated, the carbon source can remain at the particle surface of the active materials, while $H_yO_z$ evaporates in the form of $H_2O$ or OH. In some embodiments, the gaseous species may include, but is not limited to CO, $CO_2$, $O_2$, $NO_x$, $SO_x$, $Cl_2$, $H_2O$, or a mixture of any two or more thereof.

Metal phosphate (M-P—O) precursors may react with Li salts at the surface of the active materials forming a surface segregated $Li-M_2-P$—O material as a coating. In some embodiments, if the interfacial energy between the host cathode and $Li-M_2-P$—O is smaller, $Li-M_2-P$—O may be present in the form of precipitates within the host cathode matrix as a nanocomposite. When segregated toward the surface, the coatings described herein may have a reduced or no tendency to expose Mn at the surface of cathode materials.

Cathode active materials (or anode active materials) can include a carbon coating. Commonly lithium metal phosphates include a surface carbon coating for improving the conductivity of the active material. A carbon coating process can be performed during or subsequent to production of the lithium metal phosphate, for example pyrolysis of an organic substance on lithium metal phosphate particles at elevated temperature can produce active materials with carbon coatings and in some cases, secondary conductive phases in the active materials can be formed.

Cathode active materials can include a carbon coating. A carbon coating can be in a range of 0.5 to 3 wt % or 0.8 to 1.6 wt % of the active material. For example, 1 wt % carbon coating material can be on 99 wt % of the active material. This active material can then be mixed with carbon conductive additive (e.g., 3 wt % conductive carbon additive with 97 wt % active material) in the electrode slurry used to prepare the electrode.

Figure 3:
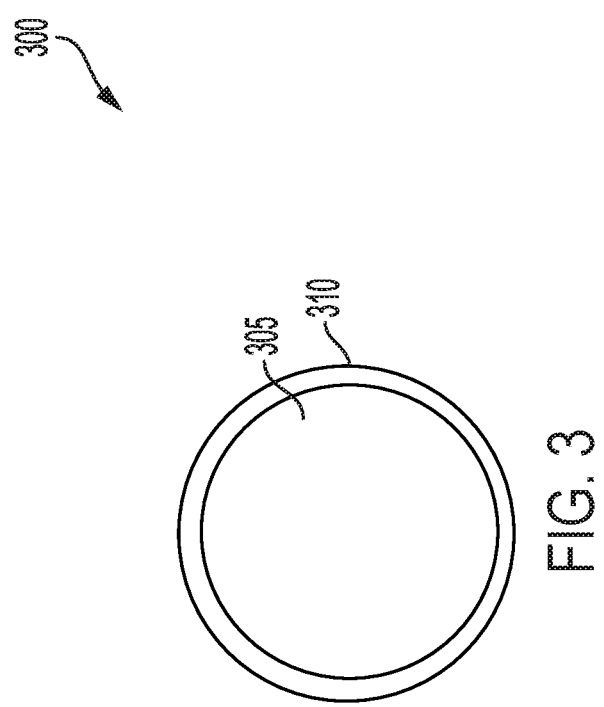
FIG. 3 depicts a perspective view of an electrode, according to an example implementation.
Figure 4:
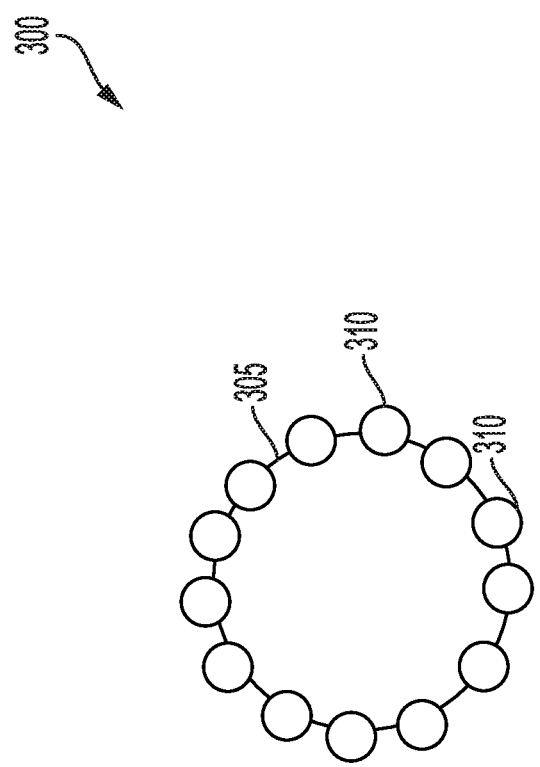
FIG. 4 depicts a perspective view of an electrode, according to an example implementation.

FIG. 3 and FIG. 4 depict perspective views of an electrode 300. The electrode 300 can include the anode layer 245 or the cathode layer 255. The electrode 300 can be disposed within the cavity 250 defined by the housing 230. The electrode 300 can include an anode or a cathode. The anode or cathode can include one or more active material particles. For example, the cathode can include a cathode active material 305. The cathode can include one or more materials selected from LMFP, LMO, $LiMO_2$, $Li_{1+x1}M_{1-x1}O_2$, and Li$_2$MnO$_3$, where 0≤x1≤1. For example, the cathode can include a Mn-rich LiMO$_2$ and Li$_{1+x1}$M$_{1-x1}$O$_2$ layered cathode. In some aspects, the cathode includes LiMn$_{x1}$Fe$_{1-x1}$PO$_4$ (LMFP) material. In some aspects, the cathode includes LiMn$_2$O$_4$ material. In some aspects, the cathode includes LiNi$_{0.5}$Mn$_{1.5}$O$_4$ spinel material. The electrode 305 can include lithium iron phosphate, lithium manganese iron phosphate, lithium nickel manganese cobalt oxide, graphite, over-lithiated layered oxides, lithium manganese nickel oxide, or a combination thereof. The electrode 305 can include an anode active material or a cathode active material.

The cathode can include one or more coatings 310 as described herein. The coating 310 can be disposed on the cathode active material 305. The cathode can include a core/shell type coating. The coating 310 may form a layer ("shell") on the surface of the cathode active material 305 (CAM) or "core" material, as depicted in FIG. 3. Alternatively, the coating 310 can include an island type coating as depicted in FIG. 4. For example, the coating 310 may be formed as discrete particles or "islands" on the surface of the cathode active material 305, that can take any number of shapes including spheres, ellipsoids, or rods.

In any implementations (e.g., in accordance with FIG. 3 or FIG. 4 or otherwise) coating 310 as disclosed herein may provide an inactive physical barrier against manganese dissolution or otherwise inhibit or reduce the dissolution of manganese from the cathode as compared to a cathode without the coating 310. The coating 310 as disclosed herein may exhibit increased thermal stability and/or inhibit or reduce gas evolution as compared to a cathode without the coating 310. The coating 310 may be ionically conducting and/or act as an insulator.

Figure 9:
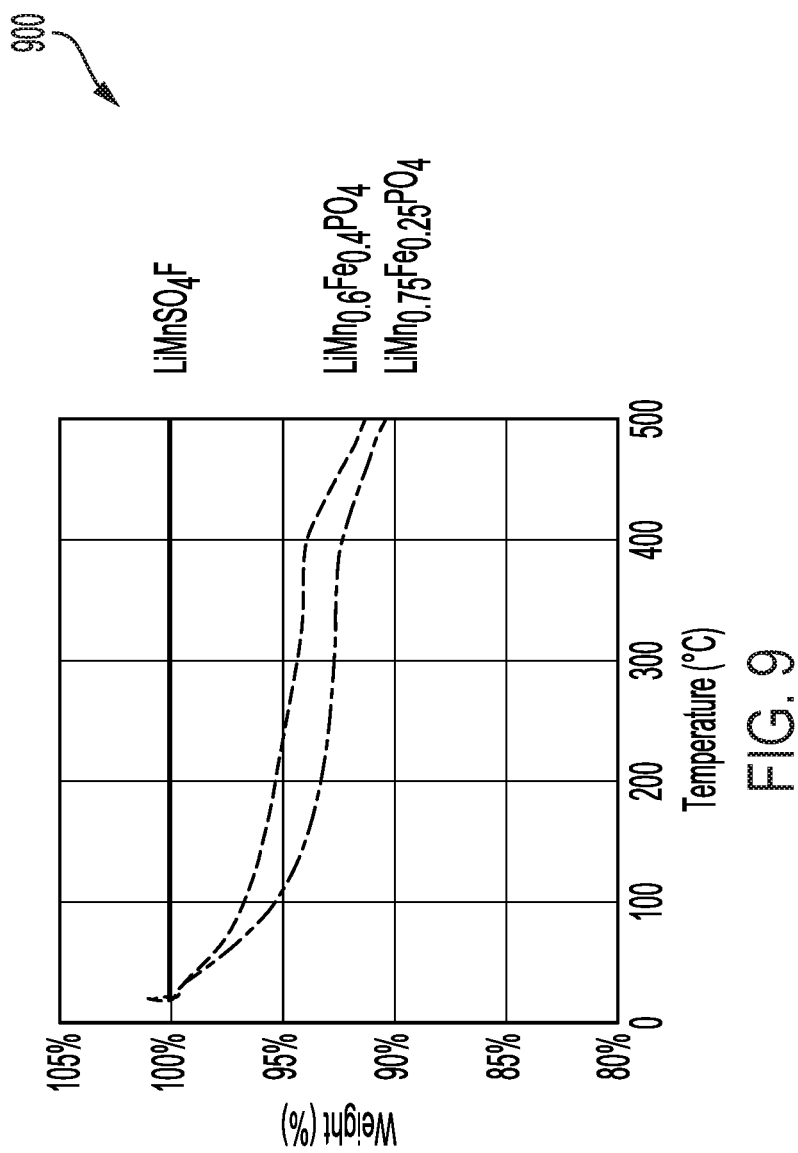
FIG. 9 shows a thermogravimetric analysis (TGA) of $LiMnSO_4F$, $LiMn_{0.6}Fe_{0.4}PO_4$, and $LiMn_{0.75}Fe_{0.25}PO_4$.

Without being bound by theory, it is believed that replacing the PO$_4$ anion group of a manganese-containing cathode material with an anion such as SO$_4$, P$_2$O$_7$, CO$_3$, and SiO$_4$ can generally increase the voltage of the cathode. When this voltage is beyond the upper voltage cutoff of normal operation range of the cell, this also means that oxygen gas evolution at the surface can be reduced. Another method to increase the thermodynamic voltage of an electrode material is by substituting the transition metal element. Among 3d metal elements, moving from early transition metal such as Ti toward Ni can generally increase the voltage. These approaches can be used together for greater effect. For example, LiFePO$_4$ has a potential of 3.4 V vs. Li/Li$^+$. By replacing Fe with Mn and PO$_4$ with SO$_4$F, the potential will increase to 3.9 V vs. Li/Li$^+$ for Li(Fe$_{1-x}$Mn$_x$)SO$_4$F. For instance, LiMnSO$_4$F may be thermally stable with no sign of decomposition up to 500° ° C., in contrast to LiMn$_{0.6}$Fe$_{0.4}$PO$_4$ and LiMn$_{0.75}$Fe$_{0.25}$PO$_4$. FIG. 9 shows a thermogravimetric analysis (TGA) of LiMnSO$_4$F, LiMn$_{0.6}$Fe$_{0.4}$PO$_4$, and LiMn$_{0.75}$Fe$_{0.25}$PO$_4$ assessed using the following parameters: Isothermal at 25° C. for 10 min; Dynamic ramp from 25° C. to 500° C. at 5°/min, under N$_2$ gas flow at 20 mL/min. In this context, thermal stability can include an ability to resist heat and/or decomposition under applied heat. For example, as reflected in the plot 900 of FIG. 9, LiMn$_{0.6}$Fe$_{0.4}$PO$_4$ and LiMn$_{0.75}$Fe$_{0.25}$PO$_4$ can decompose as the temperature increases from 0° ° C. to 500° C., wherein MnPO$_4$ within the cathode host structure may decompose according to Equation 1:

$$2MnPO_4 \rightarrow Mn_2P_2O_7 + \tfrac{1}{2}O_{2(g)} \quad (1)$$

Without being bound by theory, it also is believed that including a tavorite-based material such as LiFePO$_4$F in a cathode coating can inhibit or reduce degradation of the cathode. LiFePO$_4$F can be readily synthesized from FePO$_4$ and LiF (or from NH$_4$F+Li$_2$CO$_3$+FePO$_4$), and exhibits greater thermodynamic chemical stability than LiFePO$_4$(OH) (another tavorite structure), which tends to chemically decompose by the reaction:

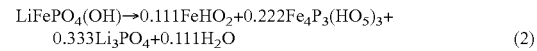
$$LiFePO_4(OH) \rightarrow 0.111FeHO_2 + 0.222Fe_4P_3(HO_5)_3 + 0.333Li_3PO_4 + 0.111H_2O \quad (2)$$

Figure 5:
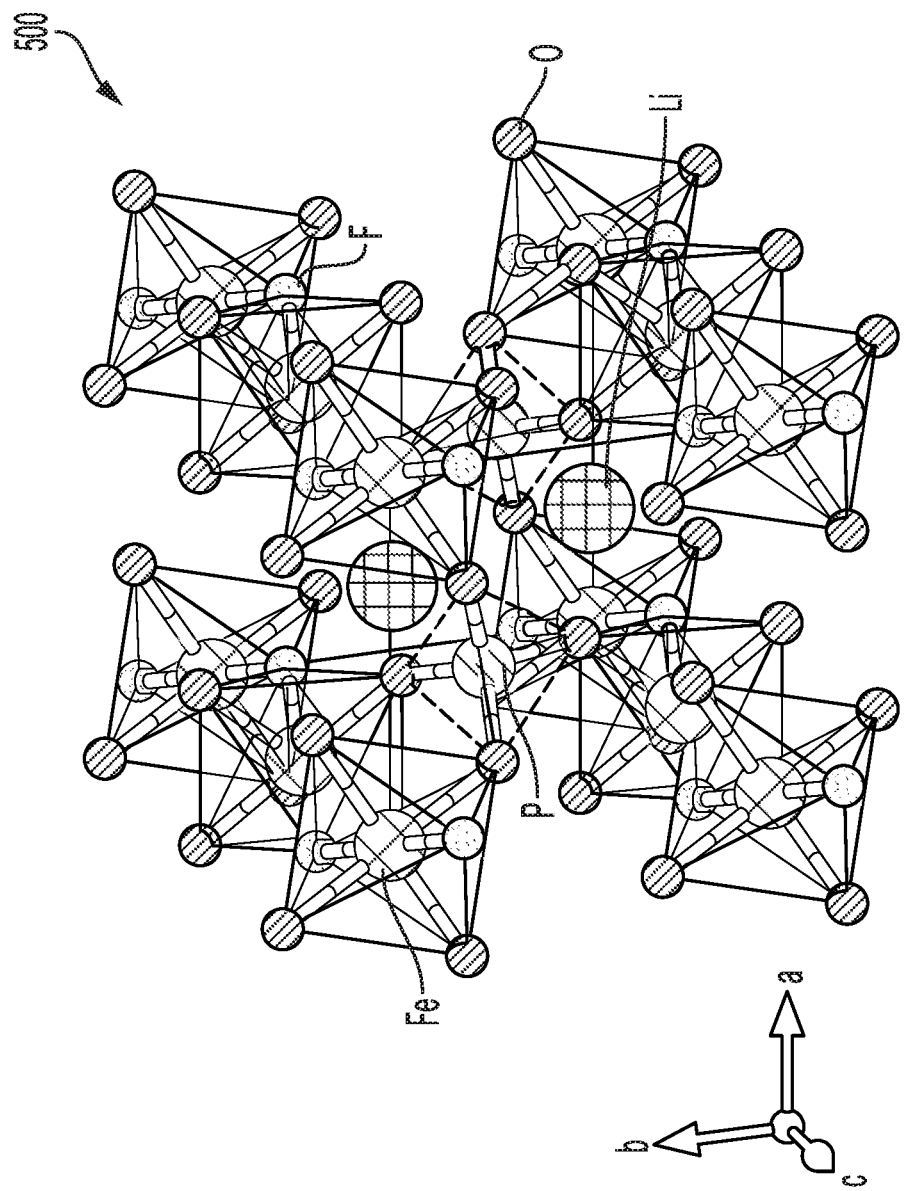
FIG. 5 depicts a crystal structure of $LiFePO_4F$, according to an example implementation.

LiFePO$_4$F has the same crystal structure as tavorite, but with —F termination. LiFePO$_4$(OH) may also form if LiFePO$_4$ is exposed to moisture for an extended period. See FIG. 5. LiFePO$_4$F exhibits greater ionic conductivity than LiFePO$_4$ (LFP).

Thus, coating 310 as described herein can include Li$_x$M$_{1-y}^1$M$_y^2$AF$_z$(OH)$_u$, where M$^1$ is a first metal, M$^2$ is a second metal, A is an anionic species, 1≤x≤2, 0≤y≤1, 0≤z≤1, and 0≤u≤1. In some aspects, M$^1$ is selected from Al, Ga, V, Fe, Mn, and Ti. In some aspects, M$^1$ is selected from Mn, Fe, Co, Ni, V, and Cr (e.g., Mn$^{2+}$, Fe$^{2+}$, Co$^{2+}$, Ni$^{2+}$, V$^{3+}$, and Cr$^{3+}$) and M$^2$ is independently selected from M$^1$ and is selected from Mn, Fe, Co, Ni, V, and Cr (e.g., Mn$^{2+}$, Fe$^{2+}$, Co$^{2+}$, Ni$^{2+}$, V$^{3+}$, and Cr$^{3+}$), such that M$^1$ can be the same as or different from M$^2$. In some aspects, A is PO$_4$. In some aspects, A is selected from SO$_4$, P$_2$O$_7$, CO$_3$, and SiO$_4$. In some aspects M$^1$ is selected from Al, Ga, V, Fe, Mn, and Ti, A is PO$_4$, and y=0. For example, in some implementations of Li$_x$M$_{1-y}^1$M$_y^2$AF$_z$(OH)$_u$, M$^1$ is Fe, A is PO$_4$, y=0, z=1, and u=0 (Li$_x$FePO$_4$F), or M$^1$ is Fe, A is PO$_4$, x=1, y=0, z=1, and u=0 (LiFePO$_4$F), or M$^1$ is Fe, A is PO$_4$, x=2, y=0, z=1, and u=0 (Li$_2$FePO$_4$F). Thus, in some aspects, the coating 310 can include one or more of Li$_x$FePO$_4$F (where 1≤x≤2), LiFePO$_4$F, Li$_2$FePO$_4$F, LiFePO$_4$(OH), LiMnSO$_4$F, LiMnP$_2$O$_7$F, LiVPO$_4$F, Li(Fe$_{1-y}$Mn$_y$)SO$_4$F, LiFeSO$_4$F, Li$_2$CoP$_2$O$_7$, LiVP$_2$O$_7$, Li$_2$VOP$_2$O$_7$, Li$_2$(Fe$_{1-y}$Mn$_y$)P$_2$O$_7$, Li$_2$FeP$_2$O$_7$, and LiMnF$_2$, where x, y, z, and u value can change from zero to non-zero integers including but not limited to 1 and 2.

Additionally or alternatively, the coating 310 can include Li$_x$M$_{1-y}$M$_y$AF$_z$(OH)$_u$, where M$^1$ is Mn, A is SO$_4$, x=1, y=0, z=1, and u=0 (LiMnSO$_4$F), or M$^1$ is Mn, M$_y^2$ is Fe, A is SO$_4$, x=1, y≠0, z=1, and u=0 (LiMn$_{1-y}$Fe$_y$SO$_4$F).

Additionally or alternatively, the coating 310 can include Li$_x$M$_{1-y}^1$M$_y^2$AF$_z$(OH)$_u$, where M$^1$ is Mn, A is selected from SO$_4$, P$_2$O$_7$, CO$_3$, and SiO$_4$, x=1, y=0, z=1 or 2, and u=0. Thus, the coating 310 can include one or more selected from LiMnSO$_4$F, LiMnP$_2$O$_7$F, or LiMnF$_2$, including combinations of any two or more thereof. The coating 310 can include one or more selected from LiFePO$_4$F, Li$_2$FePO$_4$F, LiFePO$_4$(OH), LiMnSO$_4$F, LiMnP$_2$O$_7$F, LiVPO$_4$F, Li(Fe$_{1-x}$Mn$_x$)SO$_4$F, LiFeSO$_4$F, Li$_2$CoP$_2$O$_7$, LiVP$_2$O$_7$, Li$_2$VOP$_2$O$_7$, Li$_2$(Fe$_{1-x}$Mn$_x$)P$_2$O$_7$, Li$_2$FeP$_2$O$_7$, and LiMnF$_2$ (including combinations of any two or more thereof), where x, y, z, and u value can change from zero to non-zero integers including but not limited to 1 and 2.

As noted above, FIG. 5 depicts a crystal structure 500 of LiFePO$_4$F. The crystal structure of Li$_x$M$_{1-y}^1$M$_y^2$AF$_z$(OH)$_u$ can be triclinic. The crystal structure of LiFePO$_4$F can be triclinic. Li$_x$M$_{1-y}^1$M$_y^2$AF$_z$(OH)$_u$ can have a P-1 triclinic space group. Li$_x$M$_{1-y}^1$M$_y^2$AF$_z$(OH)$_u$ can be arranged in a tavorite crystal structure. Table 1 provides an example listing of calculated and lattice parameters reported in the literature for LiFePO$_4$F. The calculated lattice parameters can be determined using atomistic computational simulations.

| Lattice parameters | Calculated | Literature |
| --- | --- | --- |
| a (Å) | 5.21 | 5.30 |
| b (Å) | 5.37 | 5.15 |
| c (Å) | 7.40 | 7.26 |
| α (°) | 106.77 | 107.88 |
| β (°) | 108.76 | 107.34 |
| γ (°) | 97.88 | 98.56 |
| Volume (Å$^3$) | 181.40 | 173.67 |

Figure 6:
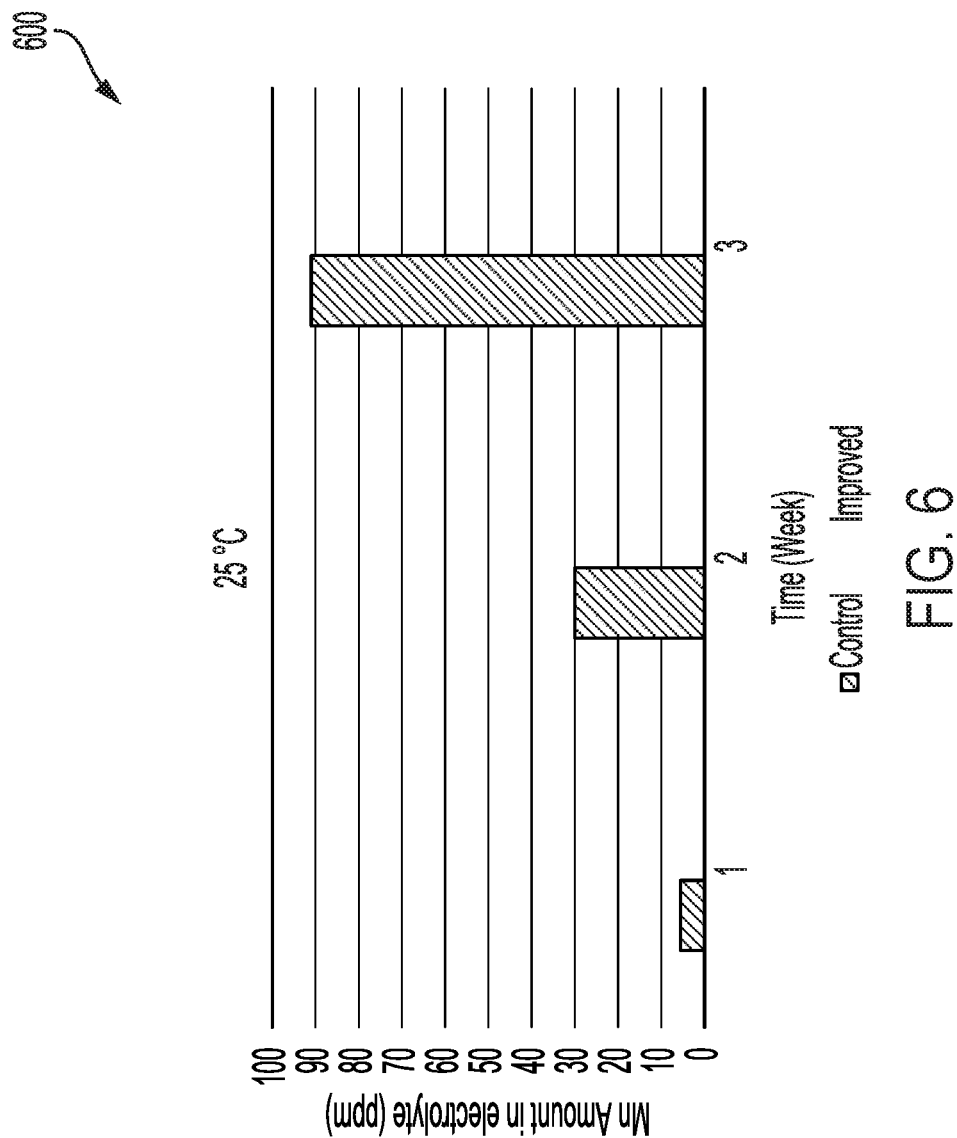
FIG. 6 depicts a plot of the amount of manganese in a control electrolyte and the amount of manganese in an electrolyte with an improved electrode as disclosed herein at 25° C., according to theoretical calculations based on an example implementation.
Figure 7:
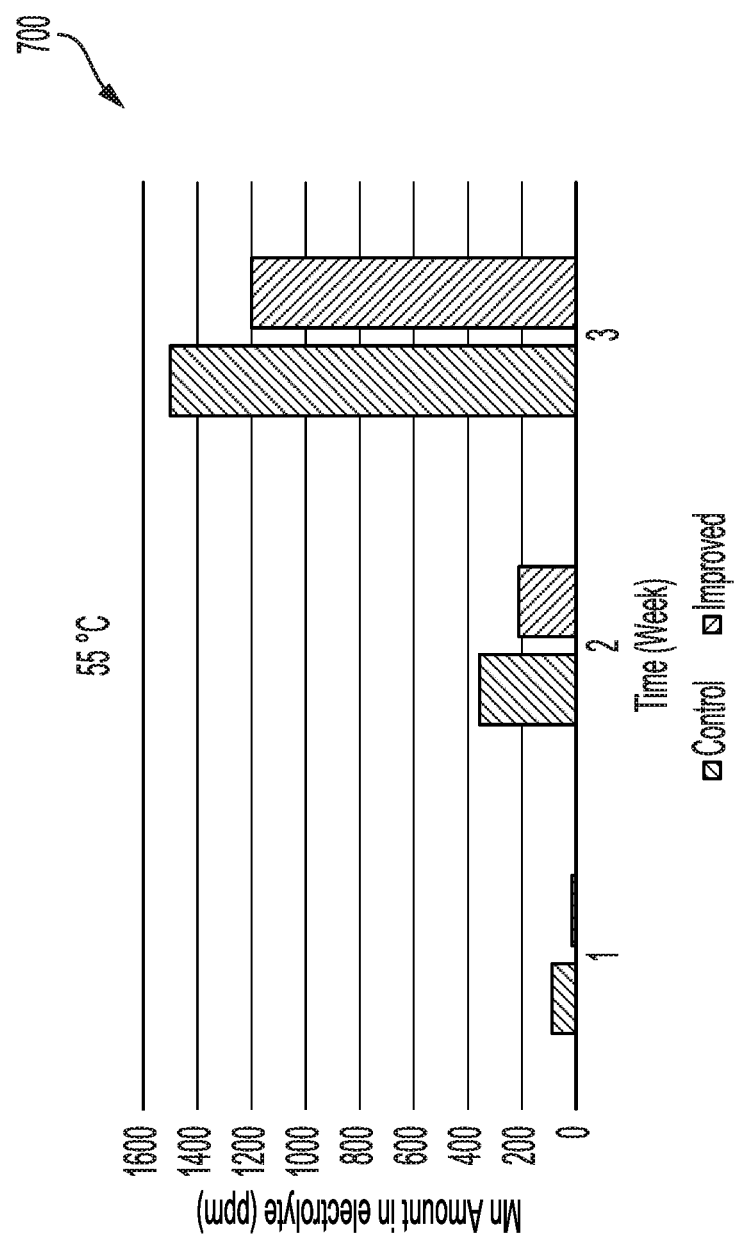
FIG. 7 depicts a plot of the amount of manganese in a control electrolyte and the amount of manganese in an electrolyte with an improved electrode as disclosed herein at 55° C., according to theoretical calculations based on an example implementation.

FIG. 6 and FIG. 7 depict plots 600, 700 of the amount of manganese (Mn) in a control electrolyte and the amount of manganese in an electrolyte with an improved electrode as described herein (e.g., provided with coating 310 as described herein) at 25° C. (FIG. 6) or 55° C. (FIG. 7), based on theoretical calculations. Generally, Mn dissolution increases as a function of temperature. Having a physical barrier in an improved electrode as described herein can help reduce the Mn dissolution that can be measured using inductive coupled plasma mass spectroscopy (ICP-MS) or ICP-OES (Inductively Coupled Plasma-Optical Emission Spectrometry). The actual amount and measurement can be affected by several factors including but not limited to electrode design and thickness, composition of electrolyte, salt additive in the electrolyte, solvent composition, electrode formulation including carbon additive and binder, electrochemical activation, voltage cutoff, cycling condition, cell normal operation/abuse/pulse testing, storage condition, temperature fluctuation, etc. As depicted in FIG. 6 and FIG. 7, the amount of manganese in the electrolyte with an improved electrode as described herein will be less than the amount of manganese in the control electrode after 1 week, 2 weeks, and 3 weeks.

Figure 8:
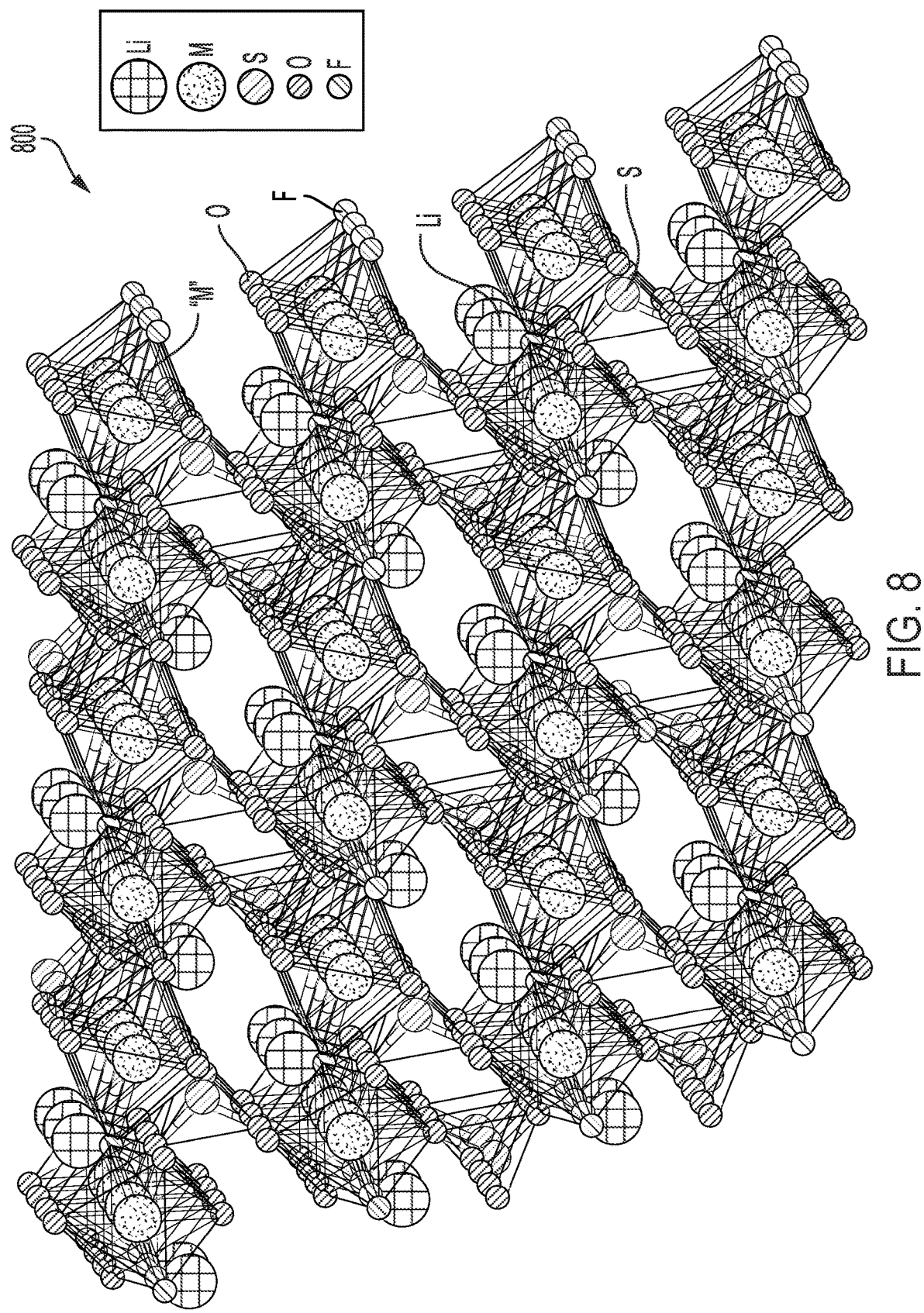
FIG. 8 depicts a crystal structure of $LiMnSO_4F$, according to an example implementation.

FIG. 8 depicts a crystal structure 800 of LiMnSO$_4$F. When the lithium (Li) and manganese (Mn) are in an ordered structure, the crystal structure tends to be a tavorite crystal structure. When the lithium (Li) and the manganese (Mn) are randomly distributed and form a disordered structure, the crystal structure can be a triplite crystal structure. Thus, for example, the crystal structure of Li$_x$M$_{1-y}^1$M$_y^2$AF$_z$(OH)$_u$ can be triplite. For example, the crystal structure of LiMnSO$_4$F can be triplite, where Li and Mn disorder further increases its voltage to 4.5 to 4.6 V vs. Li/Li$^+$, which is higher than normal lithium ion battery operating voltages. The liquid electrolyte decomposition takes place above 4.3 V vs. Li/Li$^+$, therefore, most of upper voltage cutoff is set around or about 4.3 V vs. Li/Li$^+$. In the case of an electrolyte formulated to resist high voltage decomposition, the voltage cutoff may be higher: e.g., 4.4, 4.5 V, and so on. LiMnSO$_4$F in a triplite structure with 4.5 to 4.6 V vs. Li/Li$^+$ can be an advantageous inactive coating candidate. If there is a tendency to order Li and Mn in LiMnSO$_4$F, it may become a tavorite structure and operating voltage may reduce to about 4.2 V vs. Li/Li$^+$.

Figure 10:
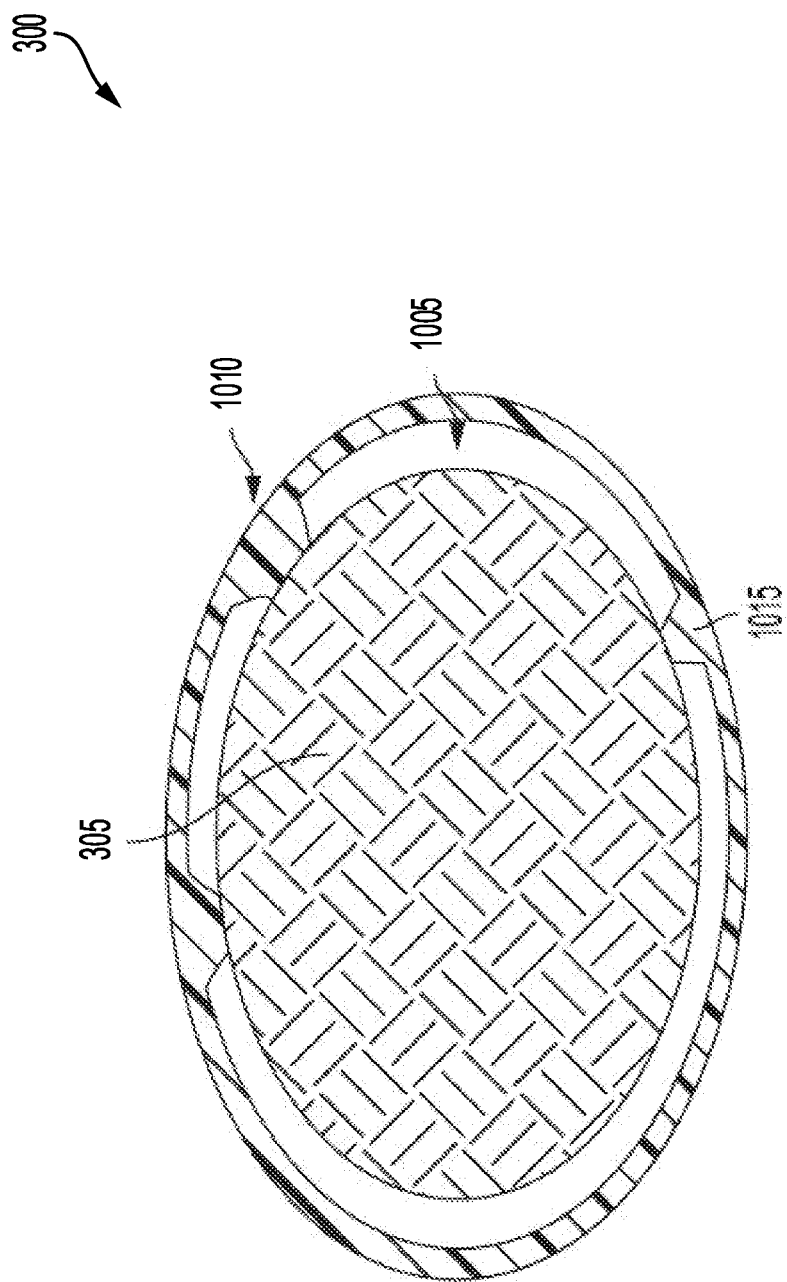
FIG. 10 depicts a perspective view of an electrode, according to an example implementation.

FIG. 10 depicts a perspective view of electrode 300 with a first coating material 1005 and a second coating material 1010 and discontinuous regions 1015. In implementations of such aspects, the coating 310 as described herein can be one or both of the first coating material 1005 and the second coating material 1010. The first coating material 1005 may include discontinuous regions 1015 of coating on the cathode active material 305, where a portion of the second coating material 1010 is formed in the discontinuous regions 1015 of the first coating material 1005. In other embodiments, a portion of the second coating material 1010 is formed in the discontinuous regions 1015 of the first coating material 1005.

In the commercial coating of the cathode active materials, commercial coating materials (e.g., the first coating material 1005) can include voids and other irregularities on the surface of the cathode active material. As the second coating material 1010 is deposited onto the cathode active material 305, the second coating material 1010 can nucleate near grain boundaries of the first coating material 1005 or the cathode active material 305. For example, the second coating material 1010 may deposit on the cathode active material 305 next to the first coating material 1005. The second coating material 1010 may also then fill the voids or uncoated areas from the first coating deposition and grow in thickness in those areas as the deposition proceeds. Where the second coating material 1010 is deposited on top of the first coating material 1005, the second coating material 1010 may be thinner. For example, in some embodiments, a thickness of the first coating material 1005 and/or the second coating material 1010 may be about 5 nm to about 2 μm. In one example, first coating may be a carbon coating material. In another embodiment, the second coating may comprise one or more selected from LiFePO$_4$F, Li$_2$FePO$_4$F, LiFePO$_4$(OH), LiMnSO$_4$F, LiMnP$_2$O$_7$F, LiVPO$_4$F, Li(Fe$_{1-y}$Mn$_y$)SO$_4$F, LiFeSO$_4$F, Li$_2$CoP$_2$O$_7$, LiVP$_2$O$_7$, Li$_2$VOP$_2$O$_7$, Li$_2$(Fe$_{1-y}$Mn$_y$)P$_2$O$_7$, Li$_2$FeP$_2$O$_7$, and LiMnF$_2$, including combinations of any two or more thereof.

Figure 11:
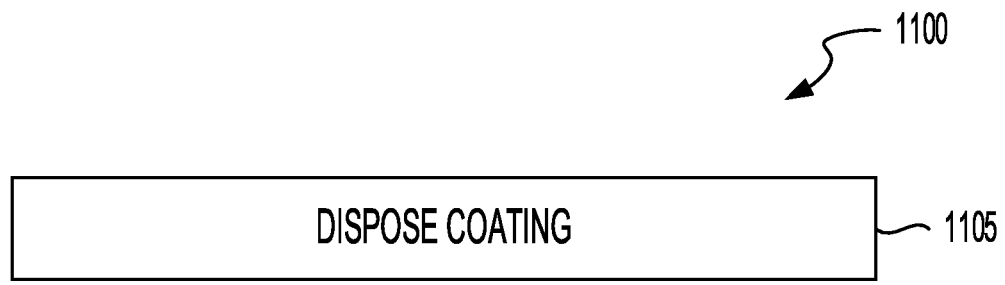
FIG. 11 depicts a method of reducing or preventing degradation of cathodes, according to an example implementation.

FIG. 11 depicts a method 1100 of reducing or preventing degradation of cathodes as disclosed herein. The method 1100 can include disposing a coating 310 as described herein on the cathode active material 305 of the cathode (ACT 1105). The cathode active material 305 can include LMFP, LMO, LiMO$_2$, Li$_{1+b}$M$_{1-b}$O$_2$, and Li$_2$MnO$_3$, where 0≤b≤1, as described herein. The coating 310 can include Li$_x$M$_{1-y}^1$M$_y^2$AF$_z$(OH)$_u$, where M$^1$ is a first metal, M$^2$ is a second metal, A is an anionic species, 1≤x≤2, 0≤y≤1, 0≤z≤1, and 0≤u≤1, as discussed above. In some aspects, Li$_x$M$_{1-y}^1$M$_y^2$AF$_z$(OH)$_u$ is one or more selected from LiFePO$_4$(OH), LiFePO$_4$F, Li$_2$FePO$_4$F, LiMnSO$_4$F, LiMnP$_2$O$_7$F, LiVPO$_4$F, Li(Fe$_{1-y}$Mn$_y$)SO$_4$F, LiFeSO$_4$F, Li$_2$CoP$_2$O$_7$, LiVP$_2$O$_7$, Li$_2$VOP$_2$O$_7$, Li$_2$(Fe$_{1-y}$Mn$_y$)P$_2$O$_7$, Li$_2$FeP$_2$O$_7$, and LiMnF$_2$, including combinations of any two or more thereof.

Li$_x$M$_{1-y}^1$M$_y^2$AF$_z$(OH)$_u$ can be arranged in a tavorite structure. The method 1100 can reduce the amount of manganese present on the surface of the cathode and/or on the surface of the coating 310 as compared to a cathode that is not provided with a coating 310. The method 1100 can reduce the amount of manganese present in the electrolyte as compared to a battery having a cathode that is not provided with a coating 310.

The coating 310 as described herein can be prepared under similar conditions as the synthesis of olivine cathodes such as LFP and LMFP. The synthesis of Li$_x$M$_{1-y}^1$M$_y^2$AF$_z$(OH)$_u$ can include solid-state synthesis, dry synthesis, or wet synthesis. For example, LiFePO$_4$F can be synthesized by a dry solid-state method or a wet solid-state method. LiMnSO$_4$F can be synthesized by a dry solid state method.

In some aspects, method 1100 can include combining one or more precursors of the coating 310 (e.g., coating precursors) and the cathode active material 305 to form the coating 310 on the cathode active material 305. For example, the method 1100 can include combining a first precursor, a second precursor, and optionally a third precursor, of the coating 310, and the cathode active material 305. For example, when coating 310 includes LiFePO$_4$F, the first precursor can include FePO$_4$ and the second precursor can include LiF, or the first precursor can include NH$_4$F, the second precursor can include Li$_2$CO$_3$ and the third precursor can include FePO$_4$. As another example, when coating 310 includes LiMnSO$_4$F, the first precursor can include MnSO$_4$·H$_2$O and the second precursor can include LiF, or the first precursor can include NH$_4$F, the second precursor can include Li$_2$CO$_3$ and the third precursor can include Mn-containing precursor materials. Other Lithium sources such as Li$_2$CO$_3$, LiOH, Li$_3$PO$_4$, and/or LiF raw materials may be used to meet the chemical stoichiometry of Li$_x$M$_{1-y}^1$M$_y^2$AF$_z$(OH)$_u$. In some embodiments, other metal containing precursors that decomposes at lower temperature, including but not limited to, Fe(OH)$_2$, Fe(OH)$_3$, Mn(OH)$_2$, MnCl$_3$, FeCl$_3$, Fe(NO$_3$)$_3$, may be alternatively used. Further anion substitution may require SO$_4$, F, BO$_3$, CO$_3$ containing chemical species.

The method 1100 can include heating the coating precursors and the cathode active material 305. For example, the method 1100 can include heating the first precursor, the second precursor, and the optional third precursor, and the cathode active material 305. For example, the method 1100 can include heating FePO$_4$, LiF, and the cathode active material 305 to provide a coating 310 that includes LiFePO$_4$F, Alternatively, the method 1100 can include heating NH$_4$F, Li$_2$CO$_3$ and FePO$_4$ and the cathode active material 305 to provide a coating that includes LiFePO$_4$F. The method 1100 can include heating MnSO$_4$·H$_2$O, LiF, and the cathode active material 305, to provide a coating 310 that includes LiMnSO$_4$F. Alternatively, the method 1100 can include heating NH$_4$F, Li$_2$CO$_3$ and Mn-containing precursor materials and the cathode active material 305 to provide a coating that includes LiMnSO$_4$F, In any implementations of method 1100, the method can include heating at any temperature and for any time period effective to form the coating at issue, and is optionally performed under a reducing environment, such as under N$_2$ gas. For example, for a coating 310 that includes LiFePO$_4$F, the heating may be at temperature from 500° C. to 600° C. under a reducing environment for a period of time of from 1 hour to 2 hours. As another example, for a coating 310 that includes LiMnSO$_4$F, the heating may be at temperature from 300° C. to 600° C. under a reducing environment for a period of time of from 2 hours 10 hours. An over-lithiating species may require a strong lithiation chemical species such as lithium aluminium hydride (LiAlH$_4$), which is widely used in organic chemistry as a reducing agent. The exact ratio between PO$_4$ and P$_2$O$_7$ formation may be controlled by gas flow rate, temperature, gas species (e.g., mixture with a more reducing agent such as H$_2$, or a more oxidizing agent such as O$_2$), and/or carbon source (leading to carbothermal reduction). Thus, a method 1100 as described herein can form a cathode active material 305 coated with a coating 310 as described herein.

Figure 12:
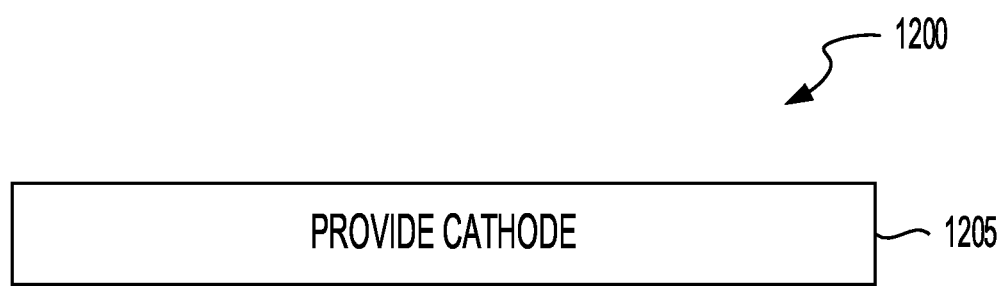
FIG. 12 depicts a method of providing a cathode, according to an example implementation.

FIG. 12 depicts a method of providing a cathode (ACT 1205). The cathode can include one or more active material particles. For example, the cathode can include the cathode active material 305. The cathode can include LMFP, LMO, LiMO$_2$, Li$_{1+x1}$M$_{1-x1}$O$_2$, and Li$_2$MnO$_3$, where 0≤x1≤1 as described herein. The cathode can include the coating 310. As discussed above, the coating 310 can reduce the dissolution of manganese form the cathode and/or reduce gas evolution as compared to a cathode without the coating 310. The coating 310 can include Li$_x$M$_{1-y}^1$M$_y^2$AF$_z$(OH)$_u$, where M$^1$ is a first metal, M$^2$ is a second metal, A is an anionic species, 1<x≤2, 0≤y≤1, 0≤z≤1, and 0≤u≤1, as described above. Thus, the coating 310 can include one or more of Li$_x$FePO$_4$F (where 1≤x≤2), e.g., LiFePO$_4$F or Li$_2$FePO$_4$F. The coating 310 can include one or more of LiMnSO$_4$F, LiMnP$_2$O$_7$F, and LiMnF$_2$

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

What is claimed is:

1. A cathode comprising:
   a cathode active material; and
   a coating disposed on the cathode active material, the coating comprising $Li_xM^1_{1-y}M^2_yAF_z(OH)_u$, wherein $M^1$ is a first metal, $M^2$ is a second metal, A is an anionic species, $1 \leq x \leq 2$, $0 < y < 1$, $0 \leq z \leq 1$, and $0 < u \leq 1$.

2. The cathode of claim 1, wherein $M^1$ is selected from Al, Ga, V, Fe, Mn, and Ti, and A is $PO_4$.

3. The cathode of claim 1, wherein a crystal structure of $Li_xM^1_{1-y}M^2_yAF_z(OH)_u$ is triclinic.

4. The cathode of claim 1, $Li_xM^1_{1-y}M^2_yAF_z(OH)_u$ is arranged in a tavorite structure.

5. The cathode of claim 1, wherein:
   $M^1$ is selected from Mn, Fe, Co, Ni, V, and Cr; and
   $M^2$ is independently selected from $M^1$ and is selected from Mn, Fe, Co, Ni, V, and Cr.

6. The cathode of claim 1, wherein $Li_xM^1_{1-y}M^2_yAF_z(OH)_u$ is thermally stable in a temperature range from 0° C. to 500° C.

7. The cathode of claim 1, wherein a crystal structure of $Li_xM^1_{1-y}M^2_yAF_z(OH)_u$ is triplite.

8. The cathode of claim 1, wherein the cathode comprises one or more materials selected from LMFP, LMO, $LiMO_2$, $Li_{1+x1}M_{1-x1}O_2$, and $Li_2MnO_3$.

9. The cathode of claim 1, wherein the coating is configured to reduce dissolution of manganese from the cathode compared to a cathode without the coating.

10. A method, comprising:
    disposing a coating on a cathode active material of a cathode, the coating comprising $Li_xM^1_{1-y}M^2_yAF_z(OH)_u$, wherein $M^1$ is a first metal, $M^2$ is a second metal, A is an anionic species, $1 \leq x \leq 2$, $0 < y < 1$, $0 \leq z \leq 1$, and $0 < u \leq 1$.

11. The method of claim 10, comprising:
    combining a first precursor of the coating, a second precursor of the coating, and optionally a third precursor of the coating, with a cathode active material; and
    heating the coating precursors and the cathode active material.

12. The method of claim 10, comprising:
    combining $FePO_4$, LiF, and a cathode active material; and
    heating the $FePO_4$, LiF, and cathode active material at a temperature in a range from 500° C. to 600° C.

13. The method of claim 10, comprising:
    combining $MnSO_4 \cdot H_2O$, LiF, and a cathode active material; and
    heating the $MnSO_4 \cdot H_2O$, LiF, and cathode active material at a temperature in a range from 300° C. to 600° C.

14. The method of claim 10, wherein the $Li_xM^1_{1-y}M^2_yAF_z(OH)_u$ is arranged in a tavorite structure.

15. The cathode of claim 1, wherein the coating comprises an inactive coating.

16. The cathode of claim 1, wherein A is selected from $P_2O_7$, F, and $SO_4$.

17. A cathode comprising:
    a cathode active material; and
    a coating disposed on the cathode active material, the coating comprising $Li_xM^1_{1-y}M^2_yAF_z(OH)_u$, wherein $M^1$ is a first metal, $M^2$ is a second metal, A is an anionic species, $1 \leq x \leq 2$, $0 < y < 1$, $0 \leq z \leq 1$, and $0 \leq u \leq 1$, and wherein a crystal structure of $Li_xM^1_{1-y}M^2_yAF_z(OH)_u$ is selected from a triclinic structure, a tavorite structure, and a triplite structure.

18. The cathode of claim 17, wherein M' is selected from Al, Ga, V, Fe, Mn, and Ti, and A is $PO_4$.

19. The cathode of claim 17, wherein:
    $M^1$ is selected from Mn, Fe, Co, Ni, V, and Cr; and
    $M^2$ is independently selected from $M^1$ and is selected from Mn, Fe, Co, Ni, V, and Cr.

20. The cathode of claim 17, wherein $0 < u \leq 1$.

* * * * *